(12) United States Patent
Yanase et al.

(10) Patent No.: US 8,455,378 B2
(45) Date of Patent: *Jun. 4, 2013

(54) ALKALI-FREE GLASS AND ALKALI-FREE GLASS SUBSTRATE

(75) Inventors: Tomoki Yanase, Shiga (JP); Shinkichi Miwa, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 219 days.

This patent is subject to a terminal disclaimer.

(21) Appl. No.: 12/457,960

(22) Filed: Jun. 26, 2009

(65) Prior Publication Data

US 2009/0270242 A1    Oct. 29, 2009

Related U.S. Application Data

(63) Continuation of application No. PCT/JP2008/060270, filed on Jun. 4, 2008.

(30) Foreign Application Priority Data

Jun. 8, 2007 (JP) ................................. 2007-152188

(51) Int. Cl.
*C03C 3/091* (2006.01)
*C03C 3/093* (2006.01)

(52) U.S. Cl.
USPC ............................................. 501/66; 501/67

(58) Field of Classification Search
USPC ..................................................... 501/66, 67
See application file for complete search history.

(56) References Cited

U.S. PATENT DOCUMENTS

| | | | | |
|---|---|---|---|---|
| 5,908,703 A | * | 6/1999 | Brix et al. | 428/426 |
| 6,319,867 B1 | * | 11/2001 | Chacon et al. | 501/66 |
| 6,329,310 B1 | | 12/2001 | Peuchert et al. | |
| 6,707,526 B2 | * | 3/2004 | Peuchert et al. | 349/158 |
| 6,881,692 B2 | * | 4/2005 | Murata et al. | 501/66 |
| 6,992,030 B2 | * | 1/2006 | Paulson | 501/66 |
| 2004/0043887 A1 | | 3/2004 | Paulson | |
| 2005/0026767 A1 | * | 2/2005 | Takase et al. | 501/56 |
| 2006/0293162 A1 | * | 12/2006 | Ellison | 501/66 |
| 2007/0232478 A1 | * | 10/2007 | Fechner et al. | 501/66 |
| 2008/0110208 A1 | * | 5/2008 | Ellison | 65/90 |
| 2009/0036290 A1 | * | 2/2009 | Cornelius et al. | 501/64 |
| 2009/0129061 A1 | * | 5/2009 | Fechner et al. | 362/97.2 |
| 2009/0226671 A1 | * | 9/2009 | Yanase et al. | 428/156 |

FOREIGN PATENT DOCUMENTS

| | | |
|---|---|---|
| JP | 10-36133 | 2/1998 |
| JP | 2000-302475 | 10/2000 |
| JP | 2003-192377 | 7/2003 |
| JP | 2004-75494 | 3/2004 |
| JP | 2004-75498 | 3/2004 |
| JP | 2005-537209 | 12/2005 |
| WO | WO 2007136054 A1 * | 11/2007 |

OTHER PUBLICATIONS

International Search Report dated Jul. 1, 2008 in the International (PCT) Application PCT/JP2008/060270 of which the present application is a continuation application.
English International Preliminary Report on Patentability (PCT/IB/338, PCT/IB/373) and Written Opinion of the International Searching Authority (PCT/ISA/237) issued Dec. 23, 2009 in International Application No. PCT/JP2008/060270, of which the present application is the U.S. National Stage.

* cited by examiner

*Primary Examiner* — Karl Group
*Assistant Examiner* — Elizabeth A Bolden
(74) *Attorney, Agent, or Firm* — Wenderoth, Lind & Ponack, L.L.P.

(57) ABSTRACT

An alkali-free glass characterized by having a glass composition being substantially free of an alkali metal oxide, $As_2O_3$ and $Sb_2O_3$ and including, in terms of mol %, 55 to 75% of $SiO_2$, 7 to 15% of $Al_2O_3$, 7 to 12% of $B_2O_3$, 0 to 3% of MgO, 7 to 12% of CaO, 0 to 5% of SrO, 0 to 2% of BaO, 0 to 5% of ZnO and 0.01 to 1% of $SnO_2$ and has a liquidus viscosity of $10^{5.2}$ dPa·s or higher and a temperature corresponding to a viscosity of $10^{2.5}$ dPa·s of 1,550° C. or lower.

17 Claims, No Drawings

ALKALI-FREE GLASS AND ALKALI-FREE GLASS SUBSTRATE

CROSS-REFERENCE TO RELATED APPLICATION

This is a continuation application of international application PCT/JP2008/060270 filed Jun. 4, 2008, and claiming the priority of Japanese application 2007-152188 filed Jun. 8, 2007.

TECHNICAL FIELD

The present invention relates to an alkali-free glass and an alkali-free glass substrate suitable for substrates of liquid crystal displays, OLED (Organic Light-Emitting Diode) displays, etc., substrates of hard disks, filters, sensors, etc., cover glasses of solid state image pickup devices such as CMOS and the like.

BACKGROUND ART

Glass substrates are widely used for displays of liquid crystal displays, OLED displays, etc., substrates of hard disks, filters, sensors, etc., cover glasses of solid state image pickup devices such as CMOS, and the like. In particular, active matrix displays in which pixels are driven by active elements, typified by thin-film transistors (hereinafter referred to as TFT(s)) form the mainstream of liquid crystal displays and OLED displays, and are widely used in the displays for displaying color images and movie images of liquid crystal televisions, notebook computers, liquid crystal monitors, cellular phones, and digital cameras. In such active matrix displays, micron-order high definition electronic circuits such as TFT elements and signal lines are formed on the surface of a glass substrate using a thin film.

The glass substrate for use in the above applications require various properties described below (see Patent Document 1 if needed):
(1) the glass substrate is required to be substantially free of an alkali metal oxide because when the glass has an alkali metal oxide, alkali ions are dispersed in a film-formed semiconductor material during a heat treatment, which leads to degradation of film properties;
(2) the glass substrate is required to have such a chemical resistance that the glass substrate is not deteriorated by chemicals (various acids, alkaline solutions, etc.) used in a photoetching process;
(3) the glass substrate is required to have a high strain point in such a manner that the substrate is not thermally contracted by heat treatment processes such as film formation, annealing, etc;
(4) the glass substrate is required to have a small density so as to achieve lightweight displays; and
(5) the glass substrate is required to be matched to the thermal expansion coefficient of peripheral members.
Patent Document 1: Japanese Patent Application Laid-open No. 2000-302475

DISCLOSURE OF THE INVENTION

Problems to be Solved by the Invention

Further, the following properties (6) to (8) are also required for the glass substrate of the above kind.

(6) The glass substrate is required to be excellent in meltability so that a melting defect does not occur in the glass substrate. In particular, to be free of a bubble defect.

A glass system containing no alkali (alkali-free glass) does not contain an alkali metal oxide, which has high effect as a melting accelerate component, and hence, there is required a highly-skilled melting technology for melting the alkali-free glass. As methods of melting the alkali-free glass, there are exemplified: a method involving optimizing the melting equipment and the melting conditions of a method of increasing the temperature of a melting furnace; and a method involving lowering the melting point of glass so that it becomes easier to melt the glass. In the latter method, as an index of the meltability of the glass, there is a temperature corresponding to a viscosity of $10^{2.5}$ dPa·s. When the temperature corresponding to a viscosity of $10^{2.5}$ dPa·s is lower, it becomes easier to melt the glass. That is, when the temperature corresponding to a viscosity of $10^{2.5}$ dPa·s is lower, the defoaming property of the molten glass is enhanced and the bubble defect of the glass substrate can be reduced, while the glass can be melted at lower temperature. Further, when the temperature corresponding to a viscosity of $10^{2.5}$ dPa·s is high, it is required to maintain a melting furnace at high temperature in order to melt the glass uniformly, and hence, refractories such as alumina and zirconia, which are used for the melting furnace, are apt to be eroded. As a result, the life cycle of the melting furnace is shortened, which brings about a rise in production cost of the glass substrate. On the other hand, when the melting temperature is lowered, the probability of occurrence of stones made of refractories, platinum group elements, or the like can be decreased, and in addition, an energy cost can be cut and an environmental impact can be reduced at the time of melting the glass. Taking the above points into consideration, to lower the melting temperature is an important technical object in producing an alkali-free glass substrate.

In the conventional alkali-free glass, the temperature corresponding to a viscosity of $10^{2.5}$ dPa·s was high in order to satisfy the demand characteristics (1) to (5), and to be specific, the temperature was higher than 1,550° C. That is, the conventional alkali-free glass had a necessity to sacrifice a part of the various demand characteristics, in particular, a necessity to increase the liquidus viscosity, in order to set the temperature corresponding to a viscosity of $10^{2.5}$ dPa·s to 1,550° C. or lower.

Further, in order to obtain a bubble-free glass, it is important to use fining agents (defoaming agent, anti-foaming agent) which generate fining gas within a temperature range, from the temperature at the time of vitrification reaction to the temperature at the time of homogenization melting. That is, the fining of the glass is carried out such that gas generated in the vitrification reaction is purged out of the glass melt by fining gas, and minute bubbles remained at the time of the homogenization melting is then floated and removed by enlarging the diameter of the bubble with the fining gas which is generated again. Incidentally, as described above, in the alkali-free glass used as the glass substrate for a liquid crystal display, the viscosity of the glass melt is high and the melting of the glass is performed at higher temperature compared to a glass containing an alkali component. Conventionally, there has been widely used $As_2O_3$ as a fining agent, which generates fining gas at a wide temperature range (about 1,200 to 1,600° C.). However, $As_2O_3$ is extremely toxic and may pollute the environment during the glass production process or during the treatment of waste glass disposition, which cannot satisfy a demand characteristic (8) to be described later. Therefore, it is required to use a fining agent other than $As_2O_3$ to thereby decrease the bubble defect with due consideration to the environment. In this case, the defoaming property of the glass becomes good by setting a temperature corresponding to a viscosity of $10^{2.5}$ dPa·s to 1,550° C. or lower, and thus, the fining effect equal to that of $As_2O_3$ can be obtained easily.

(7) The glass substrate is required to be excellent in devitrification resistance so that a foreign matter generated during melting and forming is not present in the glass.

A typical method of forming a glass substrate used for a liquid crystal display or an OLED display is an overflow down draw method. When the overflow down draw method is employed, a glass substrate having large dimensions, small thickness, and extremely flat surface can be formed without polishing the surface thereof. Therefore, the overflow down draw method is most suitable as a method of forming a glass substrate for an active matrix liquid crystal display.

In adopting the overflow down draw method, the devitrification resistance of the glass is an important property to be considered. Here, the term "devitrification" means that a crystalline foreign substance is deposited inside or on the surface of the glass during the process of forming the glass by cooling the glass raw material in a molten state at high temperature. The crystalline foreign substance blocks light, and hence is a fatal defect as a glass substrate for a display. Further, the temperature during the glass forming when the overflow down draw method is employed is lower than that at which a float method is used, even in the case where the glass having the same glass composition is used. Therefore, in order to adopt the overflow down draw method, it is required to design a glass composition in which glass devitrification is hardly caused, that is, to design a glass composition having good devitrification resistance. Specifically, taking the temperature at which the glass is formed into consideration, the glass composition is required to be designed so that the liquidus viscosity of the glass is as high as possible.

In the conventional alkali-free glass having low viscosity, the liquidus viscosity was low in order to satisfy the demand characteristics (1) to (5), and to be specific, the liquidus viscosity was lower than $10^{5.2}$ dPa·s. That is, it was difficult to produce an alkali-free glass having low viscosity and high liquidus viscosity. From the circumstances above, in order to produce a glass substrate having good surface quality, the conventional alkali-free glass had sacrificed a part of the various demand characteristics in order to set the liquidus viscosity at $10^{5.2}$ dPa·s or higher, thereby increasing the liquidus viscosity.

(8) The glass substrate is required to reduce the content of substance of environmental concern contained in the glass as much as possible or the glass to be completely free of substance of environmental concern for environmental considerations.

Recently, as is seen in effectuation of the European RoHS directive and the like, there has been increasing demand for the environmental considerations with respect to industrial products. In particular, it is demanded that the content of a substance of environmental concern contained in the product be strictly regulated, or that some products be completely free of the substance of environmental concern. The glass substrate for a display is no exception. It is demanded that the content of the substance of environmental concern contained in the glass substrate be reduced as much as possible, or that the substance of environmental concern be not used at all in the glass substrate.

Of the components contained in the glass composition, examples of those which are seen as problematic and as the substance of environmental concern include As and Sb in addition to heavy metals such as Pb, Cd, and Cr. As and Sb are the components used for a fining agent of glass, and are suitable for the glass such as an alkali-free glass, which requires high-temperature melting. However, the use thereof is not preferred from an environmental viewpoint. In particular, As is highly toxic, and the use thereof tends to be limited strictly.

In addition, as for Ba, which is an alkaline earth metal component, the compound using Ba as a raw material is a substance of environmental concern, and hence there is a case where it is preferred to reduce the use of Ba or not to contain Ba at all in the glass composition.

Accordingly, the present invention proposes an alkali-free glass in which an environmentally harmful component is reduced or which is substantially free of the environmentally harmful component while fulfilling the characteristics such as devitrification resistance and meltability, and makes it a technical object to produce an environmentally friendly alkali-free glass substrate.

Means for Solving the Problems

The inventors of the present invention have intensively studied, and as a result, they have found that the above technical object can be solved by providing an alkali-free glass which is substantially free of an alkali metal oxide, $As_2O_3$, and $Sb_2O_3$ and in which: a glass composition is regulated, in terms of mol %, to the following: 55 to 75% of $SiO_2$, 7 to 15% of $Al_2O_3$, 7 to 12% of $B_2O_3$, 0 to 3% of MgO, 7 to 12% of CaO, 0 to 5% of SrO, 0 to 2% of BaO, 0 to 5% of ZnO, and 0.01 to 1% of $SnO_2$; a liquidus viscosity is regulated to $10^{5.2}$ dPa·s or higher and a temperature corresponding to a viscosity of $10^{2.5}$ dPa·s is regulated to 1,550° C. or lower. Thus, those findings are proposed as the present invention. An alkali-free glass of the present invention, which: has a glass composition being substantially free of an alkali metal oxide, $As_2O_3$, and $Sb_2O_3$ and comprising, in terms of mol %, 55 to 75% of $SiO_2$, 7 to 15% of $Al_2O_3$, 7 to 12% of $B_2O_3$, 0 to 3% of MgO, 7 to 12% of CaO, 0 to 5% of SrO, 0 to 2% of BaO, 0 to 5% of ZnO, and 0.01 to 1% of $SnO_2$; and has a liquidus viscosity of $10^{5.2}$ dPa·s or higher and a temperature corresponding to a viscosity of $10^{2.5}$ dPa·s of 1,550° C. or lower.

Here, in the present invention, the phrase "be substantially free of an alkali metal oxide" means that no alkali metal oxide is contained other than that originating, as impurities, from raw materials, or the like, and that the content of an alkali metal oxide ($Li_2O$, $Na_2O$, $K_2O$) in a glass composition is 0.1 mol % or lower. In the present invention, the phrase "be substantially free of $As_2O_3$" means that no $As_2O_3$ is contained other than that originating, as impurities, from raw materials, or the like, and the content of $As_2O_3$ in a glass composition is 0.05 mol % or lower (preferably, 50 ppm or lower in terms of wt %). In the present invention, the phrase "be substantially free of $Sb_2O_3$" means that $Sb_2O_3$ is not contained other than that originating, as impurities, from raw materials, or the like, and the content of $Sb_2O_3$ in a glass composition is 0.05 mol % or lower. The phrase "temperature corresponding to a viscosity of $10^{2.5}$ dPa·s" used in the present invention refers to a value measured with a known platinum sphere pull up method. The term "liquidus viscosity" used in the present invention refers to a value obtained by measuring the viscosity of glass at the liquidus temperature by the known platinum sphere pull up method. Further, when glass is crushed, and a glass powder passing through a standard sieve of 30-mesh (mesh opening 500 μm) and remaining on 50-mesh (mesh opening 300 μm) is placed in a platinum boat and kept in a temperature gradient furnace for 24 hours, and thereafter, the temperature is measured, at the time of devitrification (crystalline foreign substance) in the glass being confirmed, is referred to as "liquidus temperature".

In the alkali-free glass of the present invention, the glass composition, the liquidus viscosity, and the temperature corresponding to a viscosity of $10^{2.5}$ dPa·s are strictly regulated, and the alkali-free glass of the present invention can be suitably used for the glass substrate for a liquid crystal display or an OLED display. That is, the alkali-free glass of the present invention can satisfy the above demand characteristics (1) to (8), because the glass composition of the alkali-free glass is strictly regulated within the above range. In particular, the alkali-free glass of the present invention is excellent in meltability and devitrification resistance, and hence can dramatically enhance the productivity of glass substrates.

The alkali-free glass of the present invention is substantially free of an alkali metal oxide. When an alkali metal oxide is contained in a glass substrate used for an active matrix liquid crystal display or an OLED display, an alkali component diffuses into a TFT element formed on the surface of the glass substrate, and may cause a performance abnormality thereof. The alkali-free glass of the present invention is substantially free of an alkali metal oxide, and hence, an alkali component does not diffuse into a TFT element and the performance thereof is not deteriorated.

The alkali-free glass of the present invention has a liquidus viscosity of $10^{5.2}$ dPa·s or higher. In this way, glass devitrification is less likely to be caused even when the viscosity of molten glass at the time of forming the glass is high, and hence the production efficiency of glass substrates is improved. In addition, it becomes easier to form the glass substrate by an overflow down draw method, and hence, surface quality of the glass substrate can be enhanced. Further, when the liquidus viscosity is high, a large-sized and/or thin-type glass substrate can be produced effectively.

The alkali-free glass of the present invention has a temperature corresponding to a viscosity of $10^{2.5}$ dPa·s of 1,550° C. or lower. In this way, the glass can be melted at low temperature, and hence the defoaming property of the glass and the like are improved. In addition, it becomes less likely that the refractories used for a melting furnace are eroded, which can lengthen the life cycle of the melting furnace, and as a result, the production cost of the glass substrate can be reduced. Further, when the temperature corresponding to a viscosity of $10^{2.5}$ dPa·s is low, the melting furnace does not need to be maintained at high temperature, and hence, an energy cost can be cut and an environmental impact can be reduced at the time of melting the glass. In addition, when the temperature corresponding to a viscosity of $10^{2.5}$ dPa·s is low, the occurrence of stones made of platinum element or the like can be suppressed, and hence, the probability that a circuit electrode and the like are broken or cut during the production process of a liquid crystal display can be reduced.

The alkali-free glass of the present invention contains, as a fining agent, 0.01 mol % or higher of $SnO_2$ as an essential component, and substantially no $As_2O_3$ and $Sb_2O_3$. In this way, the fining effect can be provided to the glass by $SnO_2$, even when $As_2O_3$ and $Sb_2O_3$ which may affect the environment are not used substantially. As a result, a glass substrate free of a bubble defect can be obtained. Note that $SnO_2$ can generate numerous fining gas by the valence change of an Sn ion which occurs in a high temperature range, and hence, $SnO_2$ can be suitably used as the fining agent of the alkali-free glass.

BaO is a component which improves chemical resistance and devitrification resistance of the glass, but is a substance of environmental concern, so there are some cases where the content thereof is desirably limited from an environmental viewpoint. In the alkali-free glass of the present invention, the content of BaO is strictly regulated, and to be specific, the content of BaO is limited to 2 mol % or lower, and hence, an environmentally friendly glass can be produced. Further, the alkali-free glass of the present invention may be produced as a glass substantially free of BaO, and hence, the impact on the environment can be further reduced. In addition, BaO is a component which increases density, but the content of BaO is strictly limited in the alkali-free glass of the present invention, which is advantageous from the viewpoint of reducing the density of the glass. Note that, when the glass has a composition in which the content of a substance of environmental concern is reduced or a composition which is substantially free of a substance of environmental concern, it becomes easier to recycle a glass raw material (glass).

Second, the alkali-free glass of the present invention is characterized by having a content of RO of 10 to 20%. Here, "RO" represents MgO+CaO+SrO+BaO+ZnO (total amount of MgO, CaO, SrO, BaO, and ZnO) (the same applies below).

Third, the alkali-free glass of the present invention is characterized by having a value of a molar ratio CaO/RO of 0.5 to 1.

Fourth, the alkali-free glass of the present invention is characterized by having a value of a molar ratio $CaO/Al_2O_3$ of 0.8 to 1.2.

Fifth, the alkali-free glass of the present invention is characterized by having a value of a molar ratio $Al_2O_3/B_2O_3$ of 0.8 to 1.3.

Sixth, the alkali-free glass of the present invention is characterized by being substantially free of BaO. Here, the phrase "being substantially free of BaO" used in the present invention means that the glass does not contain BaO other than originating as impurities, from raw materials or the like, and refers to the case where the content of BaO in the glass composition is 0.1 mol % or lower.

Seventh, the alkali-free glass of the present invention is characterized by having a BaO content of 0.01 to 1 mol %.

Eighth, the alkali-free glass of the present invention is characterized by having a Cl content of 0 to 1 mol %.

Ninth, the alkali-free glass of the present invention is characterized by having a MgO content of lower than 0 to 0.5 mol %.

Tenth, the alkali-free glass of the present invention is characterized by having a strain point of 630° C. or higher. Here, the term "strain point" used in the present invention refers to a value measured according to JIS R3103.

Eleventh, the alkali-free glass of the present invention is characterized by having a density of lower than 2.50 g/cm³. Here, "density" used in the present invention refers to a value measured by a known Archimedes method.

Twelfth, the alkali-free glass of the present invention is characterized by having a thermal expansion coefficient in a temperature range of 30 to 380° C. of 33 to 39×$10^{-7}$/° C. Here, "thermal expansion coefficient in a temperature range of 30 to 380° C." used in the present invention refers to a value obtained by measuring an average thermal expansion coefficient at 30 to 380° C. according to JIS R3102 using a dilatometer.

Thirteenth, the alkali-free glass of the present invention is characterized by having a thermal expansion coefficient in a temperature range of 30 to 380° C. of higher than 34×$10^{-7}$/° C.

Fourteenth, the alkali-free glass of the present invention is characterized by having a liquidus viscosity of $10^{5.5}$ dPa·s or higher.

Fifteenth, the alkali-free glass of the present invention is characterized by having a liquidus temperature of lower than 1,100° C.

Sixteenth, the alkali-free glass of the present invention is characterized by having a specific modulus of 29.5 GPa or higher. Here, the term "specific modulus" used in the present invention refers to a value obtained by dividing the Young's modulus by density, and the term "Young's modulus" refers to a value measured by a resonance method.

Seventeenth, the alkali-free glass of the present invention is characterized by being formed by an overflow down draw method.

Eighteenth, the alkali-free glass substrate of the present invention is characterized by being formed of the above-mentioned alkali-free glass.

Nineteenth, the alkali-free glass substrate of the present invention is characterized by being used for a display.

Twentieth, the alkali-free glass substrate of the present invention is characterized by being used for a liquid crystal display or an OLED display.

Twenty-first, the alkali-free glass substrate of the present invention is characterized by being used for a liquid crystal display for flat televisions.

BEST MODE FOR CARRYING OUT THE INVENTION

The reason why the glass composition range is limited as described above is described in detail below. In the following description, unless otherwise specified, "%" means "mol %".

$SiO_2$ is a glass-network forming component and the content is 55 to 75%, preferably 60 to 70%, more preferably 62 to 68%. When the $SiO_2$ content is lower than 55%, chemical resistance, especially acid resistance, is deteriorated and it is difficult to achieve low density glass. Also when the $SiO_2$ content is higher than 75%, the viscosity increases and meltability is deteriorated. Moreover, devitrification of cristobalite is easy to occur, and defects due to devitrification foreign substance in glass are easy to occur.

$Al_2O_3$ is a component having effects of increasing the strain point of glass and improving the Young's modulus of glass. The $Al_2O_3$ content is 7 to 15%, preferably 8 to 14%, more preferably 9 to 12%, and still more preferably 9.5 to 11.5%. When the $Al_2O_3$ content is lower than 7%, the devitrification temperature rises and devitrification foreign substances of cristobalite are easy to generate in glass. In addition thereto, the strain point is easily lowered. Moreover, when the $Al_2O_3$ content is higher than 15%, the buffered hydrofluoric acid resistance (hereinafter, referred to as BHF resistance) is lowered. The glass surface easily become rough, and moreover, $SiO_2$—$Al_2O_3$—RO devitrifications such as anorthite easily arises in glass.

$B_2O_3$ is a component that functions as a melting accelerate components, lowers the viscosity of glass, and improves the meltability of glass. The content thereof is 7 to 12%, preferably 8 to 11.5%, more preferably 9 to 11%, still more preferably 9.5 to 10.5%. When the $B_2O_3$ content is lower than 7%, the function as a melting accelerate component is not sufficiently demonstrated and the BHF resistance is deteriorated, and moreover the devitrification resistance is also lowered. When the $B_2O_3$ content is higher than 12%, there is a tendency that the strain point is lowered, the heat resistance is lowered, and moreover the acid resistance is deteriorated.

BaO is a component for improving the chemical resistance and devitrification resistance of glass, but is a substance of environmental concern. Thus, it is desirable to restrict the content thereof from an environmental viewpoint. More specifically, the BaO content needs to be limited to the range of: 0 to 2%, preferably 0 to 1%, more preferably 0 to 0.5% (0.5% exclusive), and still more preferably 0 to 0.2%. Particularly preferably, BaO is not contained substantially. When the BaO content is higher than 2%, a heavy load is applied to the environment, and moreover it is difficult to achieve a low density glass. In the case where, while taking into consideration the influence of BaO to the environment, there is a necessity of improving the devitrification resistance of the glass, the content of BaO is preferably 0.01 to 1% and more preferably 0.1 to 0.6%. Further, even though BaO lowers the viscosity, BaO has the least effect in lowering the viscosity among the alkaline earth metal oxides. When the viscosity of the glass is lowered too much, the glass becomes easily devitrified even when liquidus temperature thereof is the same. Therefore, from the viewpoint of optimizing the viscosity and the liquidus viscosity, the content of BaO needs to be limited.

SrO is a component that improves the chemical resistance of glass and also improves the devitrification resistance of glass. In contrast, SrO also lowers the viscosity. However, among all alkali earth metal oxides, the effect of improving meltability is small. When an excessive amount of SrO is contained in the glass composition, there is a tendency that the viscosity and thermal expansion coefficient increase. Therefore, the SrO content is 0 to 5%, preferably 1 to 4%, more preferably 2 to 3%. When the SrO content is higher than 5%, there is a possibility that the density and thermal expansion coefficient increase excessively.

MgO is a component that lowers the viscosity of glass and improves the meltability of glass, and also is a most efficient component among alkali earth metal oxides in lowering the density. When an excessive amount of MgO is contained in the glass composition, however, liquidus temperatures increase and formability is deteriorated. Moreover, there is a possibility that MgO reacts with BHF to form a product, and then the product adheres to an element of the surface of a glass substrate or adheres to a glass substrate, with the result that the glass substrate becomes rough. Therefore, it is preferable to limit the MgO content. More specifically, the content is 0 to 3%, preferably 0 to 2%, more preferably 0 to 1%, still more preferably 0% to lower than 0.5%, and particularly preferably MgO is not contained substantially. When the MgO content is higher than 3%, the devitrification resistance of glass is deteriorated, and it is difficult to adopt the overflow down draw method. In addition, there is a possibility that the BHF resistance is deteriorated. Note that the phrase "be substantially free of MgO" in the present invention means that MgO is not contained other than that originating, as impurities, from raw materials, or the like, and the content of MgO in a glass composition is 0.1% or lower.

CaO has effects of lowering the viscosity of glass, improving the meltability of glass, and alleviating the devitrification resistance of glass. CaO is an essential ingredient in the alkali-free glass of the present invention. Moreover, CaO is a component that improves the Young's modulus of glass best among bivalent alkali earth metal oxides and inhibits the elevation of glass density. CaO is a component that can impart properties suitable for glass substrates for use in liquid crystal displays. MgO also has the same effects as those of CaO, but the devitrification resistance of MgO is easily deteriorated and only a small amount of MgO can be contained in the glass composition. Considering the above, it is important in the alkali-free glass of the present invention that the CaO content is relatively high. Therefore, the CaO content is 7 to 15%, preferably 7.5 to 14%, more preferably 8 to 13%, still more preferably 9 to 12%. When the CaO content is lower than 7%, there is a possibility that the above-mentioned effects cannot be sufficiently obtained. When the CaO content is higher than 15%, the BHF resistance is deteriorated and the surface of a glass substrate is easy to be eroded, and in addition, a reaction product adheres to the surface of a glass substrate, with the result that the glass may become rough.

ZnO is a component that improves the BHF resistance of glass and improves the meltability of glass. When the ZnO content is higher than 5%, however, the glass is easily devitrified. In addition, when the ZnO content is higher than 5%, the strain point is easily lowered. This makes the glass difficult to achieve a desired heat resistance. Moreover, the influence of ZnO on the environment is not high, but ZnO may be treated as a substance similar to a substance of environmental concern, and thus it is desirable to reduce the ZnO content as much as possible. More specifically, the ZnO content is preferably 5% or lower, more preferably 2% or lower, still more preferably 1% or lower, and particularly preferably 0.5% or lower. It is ideal that ZnO be not contained. In the specification, the phrase "be substantially free of ZnO" means that ZnO is not contained other than that originating, as impurities, from raw materials, or the like, and the content of ZnO in a glass composition is 0.1% or lower.

$ZrO_2$ is a component that improves the chemical resistance of glass, especially acid resistance. However, when the $ZrO_2$ content is higher than 5%, the liquidus temperature is raised, and thus it is likely to generate devitrification stones of zircon. Therefore, the $ZrO_2$ content is preferably 0 to 5%, more preferably 0 to 1%, and more preferably 0.01 to 0.5%. Moreover, as a source of introducing $ZrO_2$, a raw material containing $ZrO_2$ as a main component may be used. Alternatively, $ZrO_2$ may be incorporated in a glass composition using elution from a refractory substance and the like which forms a glass melting furnace.

$TiO_2$ is a component that improves the chemical resistance of glass, especially acid resistance, and that also lowers a viscosity and improves meltability. In addition, $TiO_2$ is a component having an effect of preventing coloration due to ultraviolet rays. In recent years, in liquid crystal displays, an ultraviolet curable resin is generally used to seal a gap between two glass substrates. Therefore, in order to shorten the cure period of the ultraviolet curable resin, it is desirable that $TiO_2$ be contained in a small amount, and specifically, the $TiO_2$ content is preferably 0 to 3% and more preferably 0 to 1%. When the $TiO_2$ content is higher than 3%, glass is colored, and thus the transmission of a glass substrate is lowered. Therefore, it is difficult to use such glass for display applications.

The alkali-free glass of the present invention can contain other components, such as $Y_2O_3$, $Nb_2O_5$, and $WO_3$, up to 5% or lower insofar as the properties, which are features of the present invention, are not adversely affected. Note that these components have effects of improving the devitrification resistance and/or improving the Young's modulus.

As described above, $As_2O_3$ has been widely used as a glass fining agent, but the alkali-free glass of the present invention is substantially free of $As_2O_3$ from the viewpoint of environmental consideration. Moreover, the alkali-free glass of the present invention may not be substantially free of $Sb_2O_3$ as a fining agent. $Sb_2O_3$ has lower toxicity in comparison with $As_2O_3$, but $Sb_2O_3$ is a substance of environmental concern. Thus, it is preferable to restrict the use thereof from the viewpoint of environmental consideration.

Halogen such as Cl, F, and the like is added as a melting accelerate component, but the volatile matter generated at the time of glass melting has toxicity. Thus, it is preferred that the halogen content be reduced and halogen be not substantially contained. Therefore, the Cl content and F content are preferably 0 to 1%, more preferably 0 to 0.2%, and still more preferably Cl and F are not contained substantially. In the specification, the phrase "halogen such as Cl, F, and the like is not substantially contained" means that such halogen is not contained other than that originating, as impurities, from raw materials, or the like, and the content of halogen such as Cl, and F in a glass composition is 0.01% or lower.

It is preferred that the alkali-free glass of the present invention contain $SnO_2$ as a fining agent, and the $SnO_2$ content is 0.01 to 1%, preferably 0.01 to 0.5%, and more preferably 0.05 to 0.2%. $SnO_2$ can produce a large amount of fining gas by a valence change in Sn ions which occur in a high temperature range. In general, because the melting point of the alkali-free glass is higher than that of an alkali-containing glass, $SnO_2$ can be suitably used as a fining agent. On the other hand, when the $SnO_2$ content is higher than 1%, there is a fear that the devitrification resistance of the glass may be deteriorated. As a source of introducing $SnO_2$, a raw material containing $SnO_2$ as a main component may be used. Alternatively, $SnO_2$ may be incorporated in the glass composition using elution and the like from an electrode and the like placed in a glass melting furnace. As described later, when the $SnO_2$ content is high, the devitrification resistance of a glass is deteriorated. Therefore, considering the devitrification resistance of the glass, the $SnO_2$ content is preferably 0.2% or lower.

$SO_3$, metal powder of C, Al, and Si, or the like can be used as a fining agent insofar as the glass properties, which are features of the present invention, are not adversely affected. $CeO_2$, $Fe_2O_3$, and the like can also be used as a fining agent, but there is a risk that the glass is colored. Thus, it is preferred that the content thereof be 0.1% or lower.

RO is a component which lowers the density of the glass and lowers the viscosity. The content thereof is preferably 10 to 20% and more preferably 11 to 18%. When the content of RO is lower than 10%, the viscosity is easily increased. On the other hand, when the content of RO is higher than 20%, the density is easily increased.

When the value of a molar ratio CaO/RO is regulated, the viscosity of the glass can be effectively lowered, and in addition, the Young's modulus and the specific modulus of the glass can be enhanced, while lowering the density of the glass. Specifically, the value of the molar ratio CaO/RO is preferably 0.5 to 1 and more preferably 0.6 to 0.8. When the value of the molar ratio CaO/RO is out of the above range, it becomes difficult for the glass to obtain the above effects.

When the value of a molar ratio $CaO/Al_2O_3$ is regulated, the devitrification resistance of the glass can be enhanced remarkably, and a glass substrate is easily formed by an overflow down draw method. Specifically, the value of the molar ratio $CaO/Al_2O_3$ is preferably 0.8 to 1.2 and more preferably 0.85 to 1.15. When the value of the molar ratio $CaO/Al_2O_3$ is out of the above range, it becomes difficult for the glass to obtain the above effects.

When the value of a molar ratio $Al_2O_3/B_2O_3$ is regulated, the Young's modulus and the specific modulus of the glass can be enhanced, and in addition, the chemical resistance of the glass can be enhanced, while raising the strain point of the glass. Specifically, the value of the molar ratio $Al_2O_3/B_2O_3$ is preferably 0.8 to 1.3 and more preferably 0.9 to 1.2. When the value of the molar ratio $Al_2O_3/B_2O_3$ is out of the above range, it becomes difficult for the glass to obtain the above effects.

As described above, according to the overflow down draw method, glass substrates having large dimensions, small thicknesses, and extremely flat surface can be formed without polishing the surfaces thereof. Therefore, the overflow down draw method is most suitable as a method of forming glass substrates for use in active matrix liquid crystal displays. In contrast, a float method is well known as a process of forming an aperture-plate glass. However, according to the process at the time of forming a thin glass substrate, stripe-like unevenness are formed in the direction parallel to the drawing direction of the glass. There is a possibility that the stripes on the glass substrate will easily cause image deformation or non-uniform display due to thickness changes in the liquid crystal layer between glass substrates and hence, give a serious impact on the image quality of displays. In view of such circumstances, when glass substrates formed according to the float method are used as glass substrates for active matrix liquid crystal displays, unevenness need to be removed by a polishing process. However, there is a possibility that the polishing process will result in increasing the cost and that minute cracks formed on the surface of the glass substrate by the polishing process may cause disconnection of an electronic circuit formed on the surface of the glass substrate during a process of manufacturing an active matrix liquid crystal display.

As described above, in order to apply the overflow down draw method, it is indispensable to design a glass composition in such a manner that the devitrification is less likely to occur in glass, and an excellent devitrification resistance is achieved. Specifically, in view of a glass forming temperature, the liquidus viscosity of the alkali-free glass substrate of the present invention is $10^{5.2}$ dPa·s or higher, preferably $10^{5.5}$ dPa·s or higher, and more preferably $10^{5.8}$ dPa·s or higher. When the liquidus viscosity of glass is lower than $10^{5.2}$ dPa·s, the overflow down draw method cannot be adopted, resulting in that methods of forming glass are unduly limited. This makes it difficult to secure surface quality of glass substrate.

Further, in the alkali-free glass of the present invention, the liquidus temperature is preferably 1,200° C. or lower, more preferably 1,150° C. or lower, still more preferably 1,100° C. or lower, and particularly preferably lower than 1,100° C. When the liquidus temperature is higher than 1,200° C., the overflow down draw method cannot be employed and an undue restraint is imposed on the method of forming the glass, and hence, it becomes difficult to maintain the surface quality of a glass substrate.

In the case where the alkali-free glass of the present invention contains 0.01 to 0.2% of $SnO_2$, the liquidus temperature of the glass to be obtained is preferably 1,150° C. or lower and more preferably 1,100° C. or lower when $SnO_2$ is added until the $SnO_2$ content reaches 0.2% as the glass composition. An internal defect such as a bubble in glass is a fatal defect as a glass substrate for displays because transmission of light is blocked. In general, as a glass substrate is enlarged, the probability that bubbles remain becomes higher, which results in reduced productivity of glass substrates. Therefore, a technology of reducing bubbles in glass is important. Mentioned as methods of reducing bubbles contained in glass are a method using a fining agent and a method of lowering the viscosity. In the former method, $As_2O_3$ is the most effective one as a fining agent for an alkali-free glass. However, since $As_2O_3$ is a substance of environmental concern as described above, the use thereof needs to be reduced. Then, the use of $SnO_2$ has been examined as an alternative fining agent of $As_2O_3$ from the viewpoint of the environmental consideration. However, $SnO_2$ is likely to form crystalline foreign substances (devitrification), which may result in an internal defect of a glass substrate. In the case of glass in which devitrification due to $SnO_2$ is unlikely to occur, even if $SnO_2$ is introduced as a fining agent, devitrification resulting from the introduction of $SnO_2$ is unlikely to occur. Thus, the production efficiency of glass substrates can be improved and the environmental consideration can be achieved simultaneously.

Moreover, during the manufacturing process of a glass substrate, because the situation where an Sn electrode is eluted into glass is assumed to some extent, the glass in which devitrification due to $SnO_2$ is unlikely to occur is more advantageous. In this regard, according to the alkali-free glass of the present invention, even when the $SnO_2$ content in the glass composition reaches 0.2%, the liquidus temperature of the glass to be obtained can be adjusted to be 1,150° C. or lower. Therefore, the alkali-free glass of the present invention can enjoy the above-mentioned effects to the maximum extent. In contrast, in the case where the $SnO_2$ content in the glass composition reaches 0.2%, when the liquidus temperature of the glass to be obtained is higher than 1,150° C., it is difficult to enjoy the above-mentioned effects. In the specification, the phrase "the liquidus temperature of the glass to be obtained when $SnO_2$ is added until the content of $SnO_2$ reaches 0.2%" refers to a temperature at which crystals are deposited. The measurement of the temperature is performed by adding $SnO_2$ to a raw material batch until the content of $SnO_2$ reaches 0.2% in the glass composition (in terms of 100% of glass composition being the total), melting and forming glass, crushing the obtained glass sample, passing the crushed glass sample through a 30-mesh standard sieve (500 μm), placing the remaining glass powders on a 50-mesh standard sieve mesh (300 μm) in a platinum boat, and holding the same in a temperature gradient furnace for 1 week.

In the alkali-free glass of the present invention, when 0.3% of $ZrO_2$ is added to the glass composition, the liquidus temperature of the glass to be obtained is preferably 1,150° C. or lower and more preferably 1,100° C. or lower. As measures for lowering the manufacturing cost of a glass substrate, besides reducing the internal defects such as a bubbles and stones, it is effective to lengthen the life of a melting furnace, thereby reducing repair frequencies of the furnace. As measures thereof, it is preferable to use Zr refractory substances which are unlikely to be eroded due to molten glass. However, as the number of places where the Zr refractory substances are used is increased, Zr crystalline foreign substances (devitrification) are likely to form, which may result in internal defects of glass substrates. Therefore, in the case of glass in which devitrification due to $ZrO_2$ is unlikely to occur, even when the Zr refractory substance is used as a refractory substance for the melting furnace, devitrification resulting from this is unlikely to occur. Therefore, the use of such glass can reduce the manufacturing costs of glass substrates. In this regard, according to the alkali-free glass of the present invention, even when 0.3% of $ZrO_2$ is added to the glass composition, the liquidus temperature of the glass to be obtained can be set to 1,150° C. or lower. Therefore, the alkali-free glass of the present invention can enjoy the above-mentioned effects to the maximum extent. In contrast, in case where 0.3% of $ZrO_2$ is added to the glass composition, when the liquidus temperature of the glass to be obtained is higher than 1,150° C., it is difficult to enjoy the above-mentioned effects. In the specification, the phrase "the liquidus temperature of the glass to be obtained when 0.3% of $ZrO_2$ is added to the glass composition" refers to a temperature at which crystals are deposited. The measurement of the temperature is performed by adding $ZrO_2$ in an amount equivalent to 0.3% to a raw material batch in the glass composition (apparently in terms of 100.3% of glass composition in total), melting and forming glass, crushing the obtained glass sample, passing the crushed glass sample through a 30-mesh standard sieve, placing the remaining glass powders on a 50-mesh standard sieve mesh in a platinum boat, and holding the same in a temperature gradient furnace for 1 week.

In the alkali-free glass of the present invention, the temperature corresponding to a viscosity of $10^{2.5}$ dPa·s is 1,550° C. or lower and preferably 1,540° C. or lower. When the temperature corresponding to a viscosity of $10^{2.5}$ dPa·s is higher than 1,550° C., it is required to maintain a melting furnace at high temperature in order to melt the glass uniformly, and hence, refractories such as alumina and zirconia, which are used for the melting furnace, are apt to be eroded. As a result, the life cycle of the melting furnace is shortened, which easily brings about a rise in production cost of the glass substrate. Further, if the glass can be melted at low temperature, an energy cost needed for melting the glass can be suppressed and an environmental impact can be reduced.

In the alkali-free glass of the present invention, the strain point is preferably 630° C. or higher, more preferably 640° C. or higher, and still more preferably 650° C. or higher. In the process of forming electronic circuits such as TFT and wiring, a transparent conductive film, insulating film, semiconductor film, metal film, etc., are formed on the surface of the glass substrate, and moreover various circuits and patterns are formed by a photo lithography etching process. In the film formation and photolithography etching processes, the glass substrate is subjected to various heat treatments and chemical treatments. For example, in the active matrix liquid crystal display, the insulating film and transparent conductive film are formed on the glass substrate, and moreover a large number of TFTs of amorphous silicone or polycrystalline silicon are formed on the glass substrate through a photo lithography etching process. During the processes, the glass substrate is subjected to heat treatment at 300 to 600° C. The glass substrate may induce dimensional change of about several ppm (several micrometers relative to 1 m in linear dimension of the glass substrate: generally the dimensional change is referred to as thermal shrinkage) due to the heat treatment. When the thermal shrinkage of the glass substrate is large, the pattern of TFT shifts. Thus, it is impossible to form a component accurately in which multilayer thin films are laminated. In order to render the thermal shrinkage small, it is effective to improve the heat resistance of glass, and specifically raise the strain point. However, when the strain point is excessively raised, temperatures at the time of melting or forming the glass substrate are increased and loads on a glass manufacturing facility is increased, which may become a factor of increased costs. Therefore, considering the balance with other properties, the strain point is adjusted, as an index, to 680° C. or lower, especially 670° C. or lower.

In the alkali-free glass of the present invention, the density is preferably 2.54 g/cm³ or lower, more preferably 2.50 g/cm³ or lower, and still more preferably lower than 2.50 g/cm³, and particularly preferably 2.47 g/cm³ or lower. Thin and light-weight liquid crystal displays and OLED displays have been demanded, and similarly, thin and light-weight glass substrates have been demanded. Therefore, thin glass substrates having a thickness of 0.4 to 0.7 mm are used in order to meet the demand, and also glass having low density is also demanded in order to achieve light weight panels. As the density of a glass substrate is lower, the weight of glass substrate is smaller. Thus, such glass is suitable for use in mobile equipment. When the density is excessively made small, meltability and devitrification resistance are deteriorated. This makes it difficult to obtain glass substrates with large areas that are free from defects such as bubbles and stones, and it is difficult to stably manufacture a glass substrate for flat television. Therefore, considering the balance with other properties, the density is set to, as an index, 2.40 g/cm³ or higher (preferably 2.44 g/cm³ or higher, 2.45 g/cm³ or higher).

In the alkali-free glass of the present invention, the thermal expansion coefficient is preferably $33 \times 10^{-7}$/° C. or higher, more preferably 33 to $50 \times 10^{-7}$/° C., still more preferably higher than $34 \times 10^{-7}$/° C. to $45 \times 10^{-7}$/° C., particularly preferably 35 to $42 \times 10^{-7}$/° C., and most preferably 37 to $39 \times 10^{-7}$/° C. Heretofore, it has been considered to be preferable that the thermal expansion coefficient of the alkali-free glass substrate be matched to the thermal expansion coefficient of a-Si or p-Si formed on a glass substrate. Specifically, the thermal expansion coefficient of $35 \times 10^{-7}$/° C. or lower has been considered to be desirable. However, on the surfaces of liquid crystal displays or glass substrates for OLED displays, not only a-Si or p-Si film but also, SiNx with a lower thermal expansion coefficient, metallic wiring with higher thermal expansion coefficient such as Cr, Ta, or Al, and ITO are formed. From the viewpoint of matching the thermal expansion coefficient of the alkali-free glass to the thermal expansion coefficients of those members, it is not necessarily sufficient that the thermal expansion coefficient of the alkali-free glass is always low. More specifically, the alkali-free glass has a proper range of the thermal expansion coefficient, and specifically, it is difficult to say that the thermal expansion coefficient of $35 \times 10^{-7}$/° C. or lower is appropriate. Here, the inventors of the present invention have intensively conducted researches, and the following facts have become clear: the above range is appropriate for the thermal expansion coefficient of the alkali-free glass; and when the thermal expansion coefficient of the alkali-free glass is in the above range, not only the thermal expansion coefficient of the alkali-free glass matches with those of various films, but also the thermal shock resistance of the glass is enhanced. However, when the thermal expansion coefficient is out of the above range, the matching of the thermal expansion coefficient with those of various films may not be realized and the thermal shock resistance may deteriorate.

In the alkali-free glass of the present invention, the specific modulus (value obtained by dividing the Young's modulus by the density) is preferably 27 GPa/g·cm³ or higher, more preferably 28 GPa/g·cm⁻³ or higher, still more preferably 29 GPa/g·cm⁻³ or higher, and particularly preferably 29.5 GPa/g·cm⁻³. When the specific modulus is adjusted to 27 GPa/g·cm⁻³ or higher, the amount of deflection can be suppressed in such a manner that no problem arises even in large-sized thin-plate glass substrates. The term "Young's modulus" in the present invention refers to a value measured by a resonance method according to JIS R1602.

In the alkali-free glass of the present invention, the Vickers hardness is preferably 560 or higher, more preferably 570 or higher, and still more preferably 580 or higher. When the Vickers hardness is lower than 560, flaw is likely to be formed on a glass substrate, and the flaw may cause disconnection of an electronic circuit formed on the glass substrate. The term "Vickers hardness" in the present invention refers to a value measured by a method according to JIS Z2244-1992.

It is preferred that the alkali-free glass of the present invention satisfy the relation represented by $T_3 - T_4 \leq 330°$ C. when a temperature at $10^4$ dPa·s is defined as $T_3$ (° C.) and a softening temperature is defined as $T_4$ (° C.). The thickness, curvature in the plate width direction, and the shape of waviness of a glass substrate are almost determined by the time when the temperature of molten glass reaches the softening temperature from the forming temperature. Therefore, when a temperature calculated by subtracting $T_4$ from $T_3$ is set to be low, preferably 330° C. or lower, more preferably 325° C. or lower, and still more preferably 320° C. or lower, it is easy to control the thickness of glass substrate, curvature in the plate width direction, and the shape of waviness of a glass substrate. When a temperature calculated by subtracting $T_4$ from $T_3$ is limited to 330° C. or lower, the viscosity increases at high rate during cooling, and the alkali-free glass of the present invention can be formed quickly into the shape of a glass substrate. When a temperature calculated by subtracting $T_4$ from $T_3$ is adjusted to 330° C. or lower, a thin glass substrate can be easily formed into a flat shape. In addition, when a temperature calculated by subtracting $T_4$ from $T_3$ is adjusted to 330° C. or lower, a large-sized glass substrate can be easily formed into a flat shape. In the case of the down draw glass forming method, the distance inside a furnace to be subjected to slow cooling is limited in terms of the facility design. Concomitantly, period of time of slow cooling of a glass substrate needs to be limited, for example, a process of cooling the glass substrate from the forming temperature to room temperature needs to be performed in about several minutes. Therefore, the above-mentioned viscosity properties are considerably advantageous for forming a large-sized and/or thin glass substrate. In contrast, when a temperature calculated by subtracting $T_4$ from $T_3$ is higher than 330° C., it is difficult to control the thickness, curvature in the plate width direction, and shape of waviness of a glass substrate. $T_3$ is equivalent to the forming temperature. Here, the phrase "temperature corresponding to $10^4$ dPa·s" refers to a value measured with a known platinum sphere pull up method, and the term "softening point" refers to a value measured according to JIS R3103.

In the alkali-free glass of the present invention, when the glass is immersed in a 10 mass % HCl aqueous solution at 80° C. for 24 hours, the erosion depth thereof is preferably 10 μm or less and more preferably 5 μm or less. Further, in the alkali-free glass of the present invention, when the glass is immersed in a 130 BHF solution ($NH_4HF$: 4.6 mass %, $NH_4F$: 36 mass %) at 20° C. for 30 minutes, the erosion depth thereof is preferably 2 μm or less and more preferably 1 μm or less. In addition, when the alkali-free glass of the present invention is immersed in the 10 mass % HCl aqueous solution at 80° C. for 3 hours, white turbidity or roughness on the surface is preferably not confirmed by visual observation. Further, when the alkali-free glass of the present invention is immersed in a 63 BHF solution (HF: 6 mass %, $NH_4F$: 30 mass %) at 20° C. for 30 minutes, white turbidity or roughness on the surface is preferably not confirmed by visual observation. On the surface of a glass substrate for a liquid crystal display, there are formed a transparent conductive film, an insulating film, a semiconductor film, and a metal film, and also, various circuits and patterns are formed by photolithography etching. Further, during those processes of the film forming and the photolithography etching, the glass substrate is subjected to various heat treatments and chemical treatments. In general, in a TFT array process, a series of the following processes is repeated: a film forming process; a resist pattern forming process; an etching process; and a resist peeling process. At that time, the glass substrate is subjected to various chemical liquid treatments using, as echants, sulfuric acid, hydrochloric acid, an alkali solution, fluoric acid, and a BHF, and in addition, the glass substrate undergoes the etching process using plasma, which uses gases such as $CF_4$, $S_2F_6$, and HCl. Those chemical liquids are not disposable and are in a circulatory liquid system flow, taking the cost-cutting thereof into consideration. When the chemical resistance of the glass is poor, the following various problems may be caused during etching: a reaction product of the chemical liquid and the glass substrate clogs a filter of the circulatory liquid system flow; etching grade becomes unstable resulting from occurrence of white turbidity on the glass surface due to inhomogeneous etching or component change of the etchant; and the like. In particular, fluoric acid-based chemical liquids typified by BHF strongly erode the glass substrate, and thus, the above problems easily occur. It is extremely important to decrease the amount of glass eroded by a chemical liquid, from the viewpoints of preventing the chemical liquid from being contaminated and preventing the filter from being clogged with a reaction product during the process. From the above circumstances, it is required that the glass substrate be excellent in BHF resistance. Further, regarding the chemical resistance of the glass, it is also important that, in addition to the erosion depth being small, change in external appearance is not caused. In a glass substrate for a display such as an active matrix liquid crystal display, light transmittance is important, and thus, it is important that changes such as white turbidity and roughness be hardly occurred by chemical liquid treatment. The evaluation results of erosion depth and external appearance change do not necessarily correspond with each other, particularly with respect to BHF resistance. For example, when there are several pieces of glass having the same erosion depth with each other, the external appearance change occurs in some pieces of glass and the external appearance change does not occur in the other pieces of glass, depending on the composition of each glass. The alkali-free glass of the present invention can solve the above problems, because the erosion depth thereof is 2 μm or less when the glass is immersed in a 130 BHF solution at 20° C. for 30 minutes, and white turbidity or roughness on the surface is not confirmed by visual observation when the glass is immersed in a 63 BHF solution at 20° C. for 30 minutes.

In liquid crystal displays and the like, a so-called multiple patterning in which several displays are manufactured from a large-sized glass substrate (referred to as mother glass) is performed. When the multiple patterning is performed, the manufacturing cost of displays can be reduced. Therefore, a glass substrate area has been enlarged in recent years. In contrast, when the glass substrate area becomes large, the probability that a devitrification substance appears in glass substrates is increased, and thus the rate of obtaining glass substrates with good quality is sharply reduced. Therefore, the alkali-free glass substrate of the present invention with good devitrification resistance is considerably advantageous in manufacturing a large-sized substrate. The alkali-free glass substrate of the present invention is more advantageous as the substrate area is larger, for example, 0.1 $m^2$ or larger (specifically, size of 320 mm×420 mm or larger), particularly 0.5 $m^2$ or larger (specifically, size of 630 mm×830 mm or larger), 1.0 $m^2$ or larger (specifically size of 950 mm×1,150 mm or larger), 2.3 $m^2$ or larger (specifically, size of 1,400 mm×1,700 mm or larger), 3.5 $m^2$ or larger (specifically, size of 1,750 mm×2,050 mm or larger), 4.8 $m^2$ or larger (specifically, size of 2,100 mm×2,300 mm or larger), 5.8 $m^2$ or larger (specifically, size of 2,350 mm×2,500 mm or larger), 6.5 $m^2$ or larger (specifically, size of 2,400 mm×2,800 mm or larger), and 8.5 $m^2$ or larger (specifically, size of 2,850 mm×3,050 mm or larger). Properties such as low density and high specific modulus can be imparted to the alkali-free glass substrate of the present invention, and the alkali-free glass substrate of the present invention can be precisely formed into a thin-plate glass substrate. Specifically, the alkali-free glass substrate of the present invention is suitable for a glass substrate having a thickness of 0.8 mm or lower (preferably 0.7 mm or lower, more preferably 0.5 mm or lower, still more preferably 0.4 mm or lower) The alkali-free glass substrate of the present invention can reduce the amount of deformation of the glass substrate compared with conventional glass substrates even when the thickness of the glass substrate is reduced. Therefore, it is easy to prevent damages and the like of the glass substrate at the timing of putting the glass substrate in and out of a cassette shelf or the like.

The alkali-free glass substrate of the present invention is preferably used for a liquid crystal display for a flat television. In recent years, there has been a tendency that the screen size of the liquid crystal display for flat television is enlarged. The alkali-free glass substrate of the present invention can easily achieve enlargement of substrate area due to excellent productivity. Because the alkali-free glass substrate of the present invention can be formed by the overflow down draw method, favorable surface quality can be improved and the image quality of the liquid crystal display for a flat television is hardly deteriorated.

The alkali-free glass substrate of the present invention preferably has an unpolished surface. Originally the theoretical strength of glass is extremely high, but glass will break due to a stress far lower than the theoretical strength in many cases. This is because small defects, referred to as "Griffith flaw", are formed on the surface of a glass substrate in a process after a forming process, for example, in a polishing process, and the like. Therefore, when the surface of a glass substrate is not polished, the original mechanical strength of the glass substrate is difficult to be deteriorated, and the glass substrate is hard to be broken. When the surface of a glass substrate is not polished, a polishing process can be omitted in the manufacturing process of the glass substrate, thereby lowering the manufacturing cost of the glass substrate. When both entire surfaces of the alkali-free glass substrate of the present invention are not polished, the glass substrate is more difficult to be broken. With respect to the alkali-free glass substrate of the present invention, in order to prevent the breakage resulting from a cutting plane of the glass substrate, the cutting plane of the glass substrate may be subjected to chamfering and the like.

In the alkali-free-glass substrate of the present invention, the average surface roughness (Ra) of the glass substrate is preferably 10 Å or lower, more preferably 7 Å or lower, still more preferably 4 Å or lower, and most preferably 2 Å or lower. When the average surface roughness (Ra) is larger than 10 Å, it is difficult to perform accurate patterning of a circuit electrode and the like in the manufacturing process of a liquid crystal display. As a result, the probability that a circuit electrode will be disconnected and short out is increased and it is difficult to ensure the reliability of the liquid crystal display and the like. Here, the term "average surface roughness (Ra)" refers to a value measured according to SEMI D7-94 "measurement method for average surface roughness (Ra) of FPD glass substrate".

In the alkali-free-glass substrate of the present invention, the difference between the maximum plate thickness and the minimum plate thickness of the glass substrate is preferably 20 μm or lower and more preferably 10 μm or lower. When the difference between the maximum plate thickness and the minimum plate thickness of the glass substrate is larger than 20 μm, it is difficult to perform accurate patterning of a circuit electrode and the like. As a result, the probability that a circuit electrode will be disconnected and short out is increased and it is difficult to ensure the reliability of the liquid crystal display and the like. Here, the phrase "difference between maximum plate thickness and minimum plate thickness" refers to a value obtained by: measuring, with a laser-type thickness measuring apparatus, the maximum plate thickness and the minimum plate thickness of the glass substrate by scanning of an arbitrary side of the glass substrate from a plate thickness direction with laser; and subtracting the value of the minimum plate thickness from the value of the maximum plate thickness.

In the alkali-free-glass substrate of the present invention, the waviness of the glass substrate is preferably 0.1 μm or lower, more preferably 0.05 μm or lower, still more preferably lower than 0.03 μm, and most preferably 0.01 μm or lower. Ideally, it is desirable that the alkali-free glass substrate of the present invention be substantially free from waviness. When the waviness is larger than 0.1 μm, it is difficult to perform accurate patterning of a circuit electrode and the like in the manufacturing process of a liquid crystal display. As a result, the probability that a circuit electrode will be disconnected and short out is increased and it is difficult to ensure the reliability of the liquid crystal display and the like. Here, the term "waviness" refers to a value measuring WCA (filtered centerline waviness) described in JIS B-0610 using a stylus type surface texture measuring apparatus. This measurement is carried out by a method according to SEMI STD D15-1296 "measurement method for surface waviness of FPD glass substrate", with a cut off in measurement of 0.8 to 8 mm and a length in a direction vertical to the drawing direction of the glass substrate of 300 mm.

In the alkali-free-glass substrate of the present invention, the target plate thickness error is preferably 10 μm or lower and more preferably 5 μm or lower. When the target plate thickness error is larger than 10 μm, patterning accuracies of a circuit electrode and the like are lowered, and it is difficult to stably manufacture a high-quality liquid crystal display and the like under given conditions. Here, the phrase "error with respect to a target plate thickness" refers to the larger value of absolute values, the absolute value being obtained by subtracting the value of the maximum plate thickness or the minimum plate thickness measured by the above method from a target plate thickness.

From the viewpoint of preventing the glass substrate from being contaminated, most of the glass production equipment is formed of a platinum group element or a platinum group element alloy or is coated with a platinum group element or a platinum group element alloy. When the platinum group element or the platinum group element alloy is used in a melting furnace or a formed body, the platinum group element or the platinum group element alloy may be taken into molten glass and may become a stone. The probability of occurrence of the stone made of a platinum group element or the like has a correlation with melting temperature of the glass, and when the melting temperature of the glass is higher, the platinum group element or the like is more easily dissolved into a glass melt. At the time of forming the molten glass in which the stone made of a platinum group element or the like is dissolved into a glass substrate, the molten glass is stretched to a predetermined thickness. However, the stone made of a platinum group element or the like, which is present in the glass, is a solid and is hardly stretched. Therefore, a part where the stone made of a platinum group element or the like is present increases its plate thickness to an extent of the unreduced thickness of the stone made of a platinum group element or the like. The increase of the plate thickness is by and by lessened by viscosity flow of the glass in the vicinity of the stone made of a platinum group element or the like or by stretching of the glass. However, in the case where the stone made of a platinum group element or the like is present in the vicinity of the surface of the glass substrate, the glass is solidified before the increase of the plate thickness is lessened, because the amount of glass in the vicinity of the stone made of a platinum group element or the like is small, and hence, the stone is easily emerged as a protrusion on the surface of the glass substrate. When the stone made of a platinum group element or the like is present on the surface of the glass substrate, the disconnection or short of a circuit electrode of a liquid crystal display is caused. Here, the alkali-free glass substrate of the present invention has a temperature corresponding to a viscosity of $10^{2.5}$ dPa·s of 1,550° C. or lower, the probability of occurrence of a stone made of a platinum group element or the like can be decreased. Further, in the alkali-free glass substrate of the present invention, the number of protrusions formed on the surface of the glass substrate is preferably 2 or less per $m^2$, more preferably 1 or less per $m^2$, still more preferably 0.4 or less per $m^2$, particularly preferably 0.25 or less per $m^2$, and most preferably 0.1 or less per $m^2$. When the number of protrusions formed on the surface of the glass substrate is 2 or less per $m^2$, the probability of the occurrence of the disconnection or short of a circuit electrode during a film forming process becomes low. Further, when the number of protrusions is lessened, there is no need to polish the glass substrate, and thus, surface quality of the glass substrate can be enhanced. In order to set the number of protrusions formed on the surface of the glass substrate to 2 or less per $m^2$, the number of platinum group element stones, which are each a source of the protrusion, is desirably set to 40 or less per kg (preferably 20 or less per kg, 10 or less per kg, or 5 or less per kg, and particularly preferably 1 or less per kg,). Here, the term "protrusion" refers to a part where, when the glass substrate is examined with a surface roughness meter for a distance of 1,000 μm, a difference in height (height of protruded part) between the surface of the glass substrate and the distal end of the protruded part is 1 μm or more. Further, the term "platinum group element stone" refers to a stone having a maximum diameter of 3 μm or more.

The alkali-free glass substrate of the present invention can be manufactured by loading glass raw materials, which are adjusted to yield a desired glass composition, in a continuous melting furnace, melting the glass raw materials under heat, defoaming the resultant, supplying the resultant in a molding device, forming the molten glass into a plate shape, and gradually cooling the resultant.

From the viewpoint of manufacturing a glass substrate with a favorable surface quality, it is preferable to form the alkali-free glass substrate of the present invention into a plate shape according to an overflow down draw method. The method allows the glass substrate surface to be freely formed without contacting any gutter-shaped refractory substances, thus enabling a glass substrate with good surface quality to be formed without polishing. In the specification, the overflow down draw method refers to a method in which a molten glass is overflowed from both sides of a refractory gutter-shaped structure, and the overflowed molten glass is subjected to downward stretching formation while being joined at the lower end of the gutter-shaped structure, thereby manufacturing a glass substrate. There is no limitation on the configurations and materials of the gutter-shaped structure, insofar as the desired dimensions and surface accuracy of the glass substrate are achieved and insofar as a level of quality, which can be used for a glass substrate for displays, can be realized. In order to perform the downward stretching formation, force may be applied to the glass substrate according to any method. For example, the method may include rolling the glass substrate to be stretched while a refractory roll with a sufficient width is brought into contact with the glass substrate or stretching the glass substrate while a plurality of pairs of refractory rolls is brought into contact with only the vicinity of the end surface of the glass substrate. The alkali-free glass of the present invention has excellent devitrification resistance and viscosity characteristics suitable for formation, and thus enables formation of a glass substrate with high quality according to the overflow down draw method.

Note that, in the alkali-free glass substrate of the present invention, various methods other than the overflow down draw method can be employed as a forming method. For example, there can be employed a float method, a slot down method, and a re-draw method. In particular, the surface quality of the glass substrate obtained by the float method is inferior to that obtained by the overflow down draw method, and hence the surface of the glass substrate obtained by the float method needs to be subjected to polishing treatment separately, but the float method can effectively form the glass substrate.

EXAMPLES

Hereinafter, the present invention is described in detail by way of examples (Sample Nos. 1 to 56).

TABLE 1

| | | Example | | | | | | |
|---|---|---|---|---|---|---|---|---|
| | | 1 | 2 | 3 | 4 | 5 | 6 | 7 |
| Glass composition mol % | $SiO_2$ | 67.2 | 67.2 | 67.1 | 63.4 | 67.0 | 66.8 | 66.8 |
| | $Al_2O_3$ | 10.1 | 10.1 | 10.1 | 10.3 | 10.1 | 10.1 | 10.0 |
| | $B_2O_3$ | 9.1 | 9.1 | 9.5 | 10.4 | 9.1 | 9.0 | 9.9 |
| | MgO | — | — | — | 1.6 | — | — | — |
| | CaO | 9.2 | 9.2 | 9.2 | 11.7 | 9.7 | 10.3 | 9.2 |
| | SrO | 3.9 | 4.2 | 3.9 | 2.5 | 3.9 | 3.6 | 3.9 |
| | ZnO | 0.3 | — | — | — | — | — | — |
| | $SnO_2$ | 0.1 | 0.1 | 0.1 | 0.01 | 0.1 | 0.1 | 0.1 |
| | $ZrO_2$ | 0.1 | 0.1 | 0.1 | — | 0.1 | 0.1 | 0.1 |
| | Cl | — | — | — | 0.09 | — | — | — |
| RO | | 13.4 | 13.4 | 13.1 | 15.8 | 13.6 | 13.9 | 13.1 |
| CaO/RO | | 0.69 | 0.69 | 0.70 | 0.74 | 0.71 | 0.74 | 0.70 |
| CaO/$Al_2O_3$ | | 0.91 | 0.91 | 0.91 | 1.14 | 0.96 | 1.02 | 0.92 |
| $Al_2O_3$/$B_2O_3$ | | 1.11 | 1.11 | 1.06 | 0.99 | 1.11 | 1.12 | 1.01 |
| Density (g/$cm^3$) | | 2.48 | 2.48 | 2.47 | 2.44 | 2.48 | 2.48 | 2.47 |
| α[30-380] ($\times 10^{-7}$/° C.) | | 39 | 40 | 39 | 40 | 40 | 40 | 39 |
| Ps (° C.) | | 670 | 672 | 670 | 667 | 670 | 670 | 664 |
| Ta (° C.) | | 722 | 724 | 722 | 717 | 722 | 721 | 717 |
| Ts (° C.) | | 952 | 952 | 952 | 925 | 948 | 947 | 947 |
| $10^4$ dPa·s (° C.) | | 1,276 | 1,271 | 1,273 | 1,232 | 1,267 | 1,263 | 1,269 |
| $10^3$ dPa·s (° C.) | | 1,441 | 1,441 | 1,444 | 1,393 | 1,436 | 1,431 | 1,439 |
| $10^{2.5}$ dPa·s (° C.) | | 1,549 | 1,549 | 1,550 | 1,504 | 1,543 | 1,538 | 1,546 |

TABLE 1-continued

| | Example | | | | | | |
|---|---|---|---|---|---|---|---|
| | 1 | 2 | 3 | 4 | 5 | 6 | 7 |
| TL (° C.) | 1,115 | 1,120 | 1,115 | 1,100 | 1,130 | 1,125 | 1,100 |
| log η TL | 5.4 | 5.3 | 5.4 | 5.2 | 5.2 | 5.2 | 5.5 |
| $SnO_2$ devitrification resistance | ◯ | ◯ | ◯ | ◯ | ◯ | ◯ | ◯ |
| $ZrO_2$ devitrification resistance | ◯ | ◯ | ◯ | ◯ | ◯ | ◯ | ◯ |
| Erosion depth in 10 wt % HCl | ◎ | ◎ | ◎ | ◎ | ◎ | ◎ | ◎ |
| Erosion depth in 130 BHF | ◎ | ◎ | ◎ | ◎ | ◎ | ◎ | ◎ |
| External appearance evaluation in 10 wt % HCl | ◯ | ◯ | ◯ | ◯ | ◯ | ◯ | ◯ |
| External appearance evaluation in 63 BHF | ◯ | ◯ | ◯ | ◯ | ◯ | ◯ | ◯ |

TABLE 2

| | | Example | | | | | | |
|---|---|---|---|---|---|---|---|---|
| | | 8 | 9 | 10 | 11 | 12 | 13 | 14 |
| Glass composition mol % | $SiO_2$ | 66.1 | 65.7 | 66.1 | 65.1 | 66.6 | 65.7 | 65.9 |
| | $Al_2O_3$ | 10.7 | 10.1 | 10.1 | 10.1 | 10.0 | 9.9 | 10.4 |
| | $B_2O_3$ | 9.9 | 10.9 | 9.9 | 10.9 | 10.8 | 10.9 | 10.4 |
| | CaO | 9.2 | 9.2 | 9.2 | 9.2 | 9.2 | 9.2 | 9.2 |
| | SrO | 3.9 | 3.9 | 4.5 | 4.5 | 3.2 | 4.1 | 3.9 |
| | $SnO_2$ | 0.1 | 0.1 | 0.1 | 0.1 | 0.1 | 0.1 | 0.1 |
| | $ZrO_2$ | 0.1 | 0.1 | 0.1 | 0.1 | 0.1 | 0.1 | 0.1 |
| RO | | 13.1 | 13.1 | 13.7 | 13.7 | 12.4 | 13.3 | 13.1 |
| CaO/RO | | 0.70 | 0.70 | 0.67 | 0.67 | 0.74 | 0.69 | 0.70 |
| $CaO/Al_2O_3$ | | 0.86 | 0.91 | 0.91 | 0.91 | 0.92 | 0.93 | 0.88 |
| $Al_2O_3/B_2O_3$ | | 1.08 | 0.93 | 1.02 | 0.93 | 0.93 | 0.91 | 1.00 |
| Density (g/cm³) | | 2.47 | 2.46 | 2.49 | 2.49 | 2.44 | 2.47 | 2.47 |
| α[30-380] (×10⁻⁷/° C.) | | 39 | 39 | 40 | 41 | 38 | 40 | 39 |
| Ps (° C.) | | 669 | 660 | 664 | 656 | 662 | 658 | 665 |
| Ta (° C.) | | 722 | 711 | 715 | 706 | 715 | 708 | 717 |
| Ts (° C.) | | 952 | 938 | 938 | 927 | 947 | 933 | 944 |
| 10⁴ dPa · s (° C.) | | 1,268 | 1,255 | 1,256 | 1,239 | 1,270 | 1,252 | 1,261 |
| 10³ dPa · s (° C.) | | 1,433 | 1,426 | 1,423 | 1,405 | 1,440 | 1,420 | 1,429 |
| 10^{2.5} dPa · s (° C.) | | 1,537 | 1,537 | 1,531 | 1,511 | 1,548 | 1,528 | 1,535 |
| TL (° C.) | | 1,105 | 1,075 | 1,095 | 1,070 | 1,075 | 1,080 | 1,085 |
| log η TL | | 5.5 | 5.7 | 5.5 | 5.6 | 5.8 | 5.6 | 5.7 |
| $SnO_2$ devitrification resistance | | ◯ | ◯ | ◯ | ◯ | ◯ | ◯ | ◯ |
| $ZrO_2$ devitrification resistance | | ◯ | ◯ | ◯ | ◯ | ◯ | ◯ | ◯ |
| Erosion depth in 10 wt % HCl | | ◎ | ◎ | ◎ | ◎ | ◎ | ◎ | ◎ |
| Erosion depth in 130 BHF | | ◎ | ◎ | ◎ | ◎ | ◎ | ◎ | ◎ |
| External appearance evaluation in 10 wt % HCl | | ◯ | ◯ | ◯ | ◯ | ◯ | ◯ | ◯ |
| External appearance evaluation in 63 BHF | | ◯ | ◯ | ◯ | ◯ | ◯ | ◯ | ◯ |

TABLE 3

| | | Example | | | | | | |
|---|---|---|---|---|---|---|---|---|
| | | 15 | 16 | 17 | 18 | 19 | 20 | 21 |
| Glass composition mol % | $SiO_2$ | 64.2 | 63.9 | 66.2 | 63.5 | 65.9 | 66.4 | 67.1 |
| | $Al_2O_3$ | 10.1 | 10.1 | 10.4 | 11.0 | 10.0 | 10.0 | 9.7 |
| | $B_2O_3$ | 11.0 | 10.9 | 10.8 | 9.5 | 10.8 | 10.3 | 10.0 |
| | MgO | — | — | — | — | 0.8 | 0.8 | 0.5 |
| | CaO | 9.3 | 10.4 | 9.2 | 14.1 | 9.1 | 9.1 | 9.4 |
| | SrO | 5.2 | 4.5 | 3.2 | 1.89 | 3.2 | 3.2 | 3.2 |
| | $SnO_2$ | 0.1 | 0.1 | 0.1 | 0.01 | 0.1 | 0.1 | 0.1 |
| | $ZrO_2$ | 0.1 | 0.1 | 0.1 | — | 0.1 | 0.1 | — |

TABLE 3-continued

|  | Example | | | | | | |
|---|---|---|---|---|---|---|---|
|  | 15 | 16 | 17 | 18 | 19 | 20 | 21 |
| RO | 14.5 | 14.9 | 12.4 | 16.0 | 13.1 | 13.1 | 13.1 |
| CaO/RO | 0.64 | 0.70 | 0.74 | 0.88 | 0.69 | 0.69 | 0.71 |
| CaO/$Al_2O_3$ | 0.92 | 1.03 | 0.88 | 1.28 | 0.91 | 0.91 | 0.97 |
| $Al_2O_3/B_2O_3$ | 0.92 | 0.93 | 0.96 | 1.16 | 0.93 | 0.97 | 0.97 |
| Density (g/cm³) | 2.50 | 2.50 | 2.44 | 2.44 | 2.45 | 2.45 | 2.45 |
| α[30-380] (×$10^{-7}$/° C.) | 42 | 42 | 38 | 40 | 39 | 38 | 39 |
| Ps (° C.) | 656 | 656 | 663 | 676 | 660 | 662 | 662 |
| Ta (° C.) | 705 | 704 | 716 | 727 | 711 | 714 | 714 |
| Ts (° C.) | 919 | 914 | 949 | 948 | 940 | 945 | 943 |
| $10^4$ dPa · s (° C.) | 1,226 | 1,219 | 1,270 | 1,234 | 1,261 | 1,265 | 1,269 |
| $10^3$ dPa · s (° C.) | 1,390 | 1,381 | 1,439 | 1,393 | 1,429 | 1,434 | 1,435 |
| $10^{2.5}$ dPa · s (° C.) | 1,493 | 1,484 | 1,546 | 1,507 | 1,535 | 1,541 | 1,543 |
| TL (° C.) | 1,075 | 1,080 | 1,080 | 1,110 | 1,110 | 1,090 | 1,110 |
| log η TL | 5.4 | 5.3 | 5.8 | 5.2 | 5.3 | 5.6 | 5.4 |
| $SnO_2$ devitrification resistance | ○ | ○ | ○ | ○ | ○ | ○ | ○ |
| $ZrO_2$ devitrification resistance | ○ | ○ | ○ | ○ | ○ | ○ | ○ |
| Young's modulus | — | — | — | 76 | — | — | — |
| Specific modulus | — | — | — | 31 | — | — | — |
| Erosion depth in 10 wt % HCl | ⊚ | ⊚ | ⊚ | ⊚ | ⊚ | ⊚ | ⊚ |
| Erosion depth in 130 BHF | ⊚ | ⊚ | ⊚ | ⊚ | ⊚ | ⊚ | ⊚ |
| External appearance evaluation in 10 wt % HCl | ○ | ○ | ○ | ○ | ○ | ○ | ○ |
| External appearance evaluation in 63 BHF | ○ | ○ | ○ | ○ | ○ | ○ | ○ |

TABLE 4

|  |  | Example | | | | | | |
|---|---|---|---|---|---|---|---|---|
|  |  | 22 | 23 | 24 | 25 | 26 | 27 | 28 |
| Glass composition mol % | $SiO_2$ | 66.6 | 66.1 | 66.6 | 66.7 | 66.0 | 66.8 | 67.1 |
|  | $Al_2O_3$ | 10.3 | 10.0 | 9.7 | 10.0 | 10.2 | 9.7 | 9.7 |
|  | $B_2O_3$ | 10.8 | 10.8 | 10.4 | 10.8 | 10.8 | 10.3 | 10.3 |
|  | MgO | — | — | — | — | 0.8 | 0.5 | 0.5 |
|  | CaO | 9.2 | 10.3 | 9.2 | 9.2 | 9.2 | 9.4 | 9.4 |
|  | SrO | 2.9 | 2.6 | 3.9 | 3.2 | 2.9 | 3.2 | 2.9 |
|  | $SnO_2$ | 0.1 | 0.1 | 0.1 | 0.1 | 0.1 | 0.1 | 0.1 |
|  | $ZrO_2$ | 0.1 | 0.1 | 0.1 | — | — | — | — |
| RO |  | 12.1 | 12.9 | 13.1 | 12.4 | 12.9 | 13.1 | 12.8 |
| CaO/RO |  | 0.76 | 0.80 | 0.70 | 0.74 | 0.71 | 0.72 | 0.73 |
| CaO/$Al_2O_3$ |  | 0.89 | 1.03 | 0.95 | 0.92 | 0.90 | 0.97 | 0.97 |
| $Al_2O_3/B_2O_3$ |  | 0.95 | 0.93 | 0.93 | 0.93 | 0.94 | 0.94 | 0.94 |
| Density (g/cm³) |  | 2.43 | 2.44 | 2.46 | 2.44 | 2.44 | 2.45 | 2.44 |
| α[30-380] (×$10^{-7}$/° C.) |  | 38 | 39 | 39 | 38 | 38 | 39 | 38 |
| Ps (° C.) |  | 665 | 661 | 660 | 660 | 659 | 659 | 661 |
| Ta (° C.) |  | 719 | 713 | 712 | 712 | 712 | 711 | 713 |
| Ts (° C.) |  | 955 | 943 | 941 | 943 | 942 | 940 | 944 |
| $10^4$ dPa · s (° C.) |  | 1,277 | 1,263 | 1,264 | 1,268 | 1,262 | 1,267 | 1,273 |
| $10^3$ dPa · s (° C.) |  | 1,445 | 1,432 | 1,436 | 1,433 | 1,425 | 1,432 | 1,440 |
| $10^{2.5}$ dPa · s (° C.) |  | 1,550 | 1,540 | 1,546 | 1,540 | 1,531 | 1,540 | 1,548 |
| TL (° C.) |  | 1,075 | 1,095 | 1,100 | 1,065 | 1,080 | 1,080 | 1,100 |
| log η TL |  | 5.9 | 5.5 | 5.4 | 5.9 | 5.7 | 5.7 | 5.5 |
| $SnO_2$ devitrification resistance |  | ○ | ○ | ○ | ○ | ○ | ○ | ○ |
| $ZrO_2$ devitrification resistance |  | ○ | ○ | ○ | ○ | ○ | ○ | ○ |
| Young's modulus |  | — | — | — | 72 | 72 | 73 | 73 |
| Specific modulus |  | — | — | — | 29 | 30 | 30 | 30 |
| Erosion depth in 10 wt % HCl |  | ⊚ | ⊚ | ⊚ | ⊚ | ⊚ | ⊚ | ⊚ |
| Erosion depth in 130 BHF |  | ⊚ | ⊚ | ⊚ | ⊚ | ⊚ | ⊚ | ⊚ |
| External appearance evaluation in 10 wt % HCl |  | ○ | ○ | ○ | ○ | ○ | ○ | ○ |
| External appearance evaluation in 63 BHF |  | ○ | ○ | ○ | ○ | ○ | ○ | ○ |

TABLE 5

| | | Example | | | | | | |
|---|---|---|---|---|---|---|---|---|
| | | 29 | 30 | 31 | 32 | 33 | 34 | 35 |
| Glass composition mol % | $SiO_2$ | 67.2 | 66.8 | 66.7 | 66.2 | 67.5 | 66.3 | 65.1 |
| | $Al_2O_3$ | 9.8 | 9.7 | 9.7 | 9.6 | 9.8 | 10.2 | 11.1 |
| | $B_2O_3$ | 10.0 | 10.3 | 10.0 | 11.1 | 9.4 | 10.3 | 9.6 |
| | MgO | — | 0.5 | 0.5 | 0.5 | 0.5 | 0.5 | 1.3 |
| | CaO | 9.5 | 9.4 | 9.5 | 9.3 | 9.5 | 9.5 | 9.5 |
| | SrO | 3.4 | 3.2 | 3.5 | 3.2 | 3.2 | 2.9 | 3.2 |
| | BaO | — | — | — | — | — | 0.2 | — |
| | $SnO_2$ | 0.1 | 0.1 | 0.1 | 0.1 | 0.1 | 0.1 | 0.1 |
| | Cl | — | — | — | — | — | — | 0.1 |
| RO | | 12.9 | 13.1 | 13.5 | 13.0 | 13.2 | 13.1 | 14.0 |
| CaO/RO | | 0.74 | 0.72 | 0.70 | 0.72 | 0.72 | 0.73 | 0.68 |
| $CaO/Al_2O_3$ | | 0.97 | 0.97 | 0.98 | 0.97 | 0.97 | 0.93 | 0.86 |
| $Al_2O_3/B_2O_3$ | | 1.02 | 0.94 | 0.97 | 0.86 | 1.04 | 0.99 | 1.16 |
| Density (g/cm$^3$) | | 2.45 | 2.45 | 2.46 | 2.44 | 2.46 | 2.45 | 2.43 |
| α[30-380] (×10$^{-7}$/° C.) | | 39 | 39 | 39 | 39 | 39 | 39 | 37 |
| Ps (° C.) | | 663 | 659 | 661 | 655 | 665 | 662 | 677 |
| Ta (° C.) | | 715 | 711 | 712 | 706 | 718 | 714 | 729 |
| Ts (° C.) | | 945 | 938 | 937 | 930 | 948 | 943 | 953 |
| $10^4$ dPa · s (° C.) | | 1,271 | 1,262 | 1,258 | 1,253 | 1,271 | 1,261 | 1,268 |
| $10^3$ dPa · s (° C.) | | 1,440 | 1,428 | 1,425 | 1,420 | 1,438 | 1,425 | 1,429 |
| $10^{2.5}$ dPa · s (° C.) | | 1,548 | 1,537 | 1,533 | 1,527 | 1,546 | 1,532 | 1,537 |
| TL (° C.) | | 1,115 | 1,100 | 1,105 | 1,085 | 1,115 | 1,085 | 1,110 |
| log η TL | | 5.4 | 5.5 | 5.3 | 5.5 | 5.4 | 5.6 | 5.5 |
| $SnO_2$ devitrification resistance | | ○ | ○ | ○ | ○ | ○ | ○ | ○ |
| $ZrO_2$ devitrification resistance | | ○ | ○ | ○ | ○ | ○ | ○ | ○ |
| Young's modulus | | 73 | 73 | 73 | 73 | 73 | 73 | 75 |
| Specific modulus | | 30 | 30 | 30 | 30 | 30 | 30 | 31 |
| Erosion depth in 10 wt % HCl | | ◎ | ◎ | ◎ | ◎ | ◎ | ◎ | ◎ |
| Erosion depth in 130 BHF | | ◎ | ◎ | ◎ | ◎ | ◎ | ◎ | ◎ |
| External appearance evaluation in 10 wt % HCl | | ○ | ○ | ○ | ○ | ○ | ○ | ○ |
| External appearance evaluation in 63 BHF | | ○ | ○ | ○ | ○ | ○ | ○ | ○ |

TABLE 6

| | | Example | | | | | | |
|---|---|---|---|---|---|---|---|---|
| | | 36 | 37 | 38 | 39 | 40 | 41 | 42 |
| Glass composition mol % | $SiO_2$ | 65.9 | 65.5 | 66.4 | 66.0 | 65.6 | 66.4 | 66.5 |
| | $Al_2O_3$ | 10.6 | 10.9 | 10.6 | 10.9 | 11.3 | 10.9 | 10.9 |
| | $B_2O_3$ | 10.3 | 10.3 | 9.8 | 9.9 | 9.9 | 9.8 | 9.4 |
| | MgO | 0.5 | 0.5 | 0.5 | 0.5 | 0.5 | 0.5 | 0.5 |
| | CaO | 9.5 | 9.5 | 9.5 | 9.5 | 9.5 | 9.5 | 9.5 |
| | SrO | 2.9 | 2.9 | 2.9 | 2.9 | 2.9 | 2.6 | 2.9 |
| | BaO | 0.2 | 0.2 | 0.2 | 0.2 | 0.2 | 0.2 | 0.2 |
| | $SnO_2$ | 0.1 | 0.1 | 0.1 | 0.1 | 0.1 | 0.1 | 0.1 |
| RO | | 13.1 | 13.1 | 13.1 | 13.1 | 13.1 | 12.8 | 13.1 |
| CaO/RO | | 0.73 | 0.73 | 0.73 | 0.73 | 0.73 | 0.74 | 0.73 |
| $CaO/Al_2O_3$ | | 0.90 | 0.87 | 0.90 | 0.87 | 0.84 | 0.87 | 0.87 |
| $Al_2O_3/B_2O_3$ | | 1.03 | 1.06 | 1.08 | 1.10 | 1.14 | 1.11 | 1.16 |
| Density (g/cm$^3$) | | 2.46 | 2.46 | 2.46 | 2.46 | 2.46 | 2.45 | 2.46 |
| α[30-380] (×10$^{-7}$/° C.) | | 39 | 39 | 38 | 39 | 39 | 38 | 39 |
| Ps (° C.) | | 663 | 666 | 665 | 667 | 670 | 670 | 670 |
| Ta (° C.) | | 717 | 720 | 719 | 722 | 724 | 724 | 725 |
| Ts (° C.) | | 947 | 949 | 952 | 954 | 955 | 959 | 959 |
| $10^4$ dPa · s (° C.) | | 1,262 | 1,265 | 1,272 | 1,268 | 1,267 | 1,275 | 1,281 |
| $10^3$ dPa · s (° C.) | | 1,423 | 1,425 | 1,435 | 1,428 | 1,426 | 1,438 | 1,443 |
| $10^{2.5}$ dPa · s (° C.) | | 1,528 | 1,529 | 1,542 | 1,532 | 1,530 | 1,542 | 1,547 |
| TL (° C.) | | 1,085 | 1,080 | 1,090 | 1,085 | 1,100 | 1,100 | 1,105 |
| log η TL | | 5.7 | 5.8 | 5.7 | 5.8 | 5.6 | 5.7 | 5.6 |
| $SnO_2$ devitrification resistance | | ○ | ○ | ○ | ○ | ○ | ○ | ○ |
| $ZrO_2$ devitrification resistance | | ○ | ○ | ○ | ○ | ○ | ○ | ○ |
| Young's modulus | | 73 | 73 | 74 | 73 | 73 | 74 | 73 |
| Specific modulus | | 30 | 30 | 30 | 30 | 30 | 30 | 30 |
| Erosion depth in 10 wt % HCl | | ◎ | ◎ | ◎ | ◎ | ◎ | ◎ | ◎ |

TABLE 6-continued

|  | Example | | | | | | |
|---|---|---|---|---|---|---|---|
|  | 36 | 37 | 38 | 39 | 40 | 41 | 42 |
| Erosion depth in 130 BHF | ◉ | ◉ | ◉ | ◉ | ◉ | ◉ | ◉ |
| External appearance evaluation in 10 wt % HCl | ○ | ○ | ○ | ○ | ○ | ○ | ○ |
| External appearance evaluation in 63 BHF | ○ | ○ | ○ | ○ | ○ | ○ | ○ |

TABLE 7

|  |  | Example | | | | | | |
|---|---|---|---|---|---|---|---|---|
|  |  | 43 | 44 | 45 | 46 | 47 | 48 | 49 |
| Glass composition mol % | $SiO_2$ | 66.4 | 66.1 | 65.1 | 66.5 | 66.2 | 66.4 | 66.1 |
|  | $Al_2O_3$ | 10.8 | 11.3 | 11.3 | 10.8 | 11.0 | 10.8 | 10.9 |
|  | $B_2O_3$ | 9.9 | 9.4 | 10.4 | 9.7 | 9.9 | 9.7 | 9.9 |
|  | MgO | — | 0.5 | 0.5 | — | — | — | 0.5 |
|  | CaO | 9.5 | 9.5 | 9.5 | 9.5 | 9.5 | 9.5 | 9.5 |
|  | SrO | 3.1 | 2.9 | 2.9 | 3.2 | 3.1 | 3.5 | 2.3 |
|  | BaO | 0.2 | 0.2 | 0.2 | 0.2 | 0.2 | — | 0.7 |
|  | $SnO_2$ | 0.1 | 0.1 | 0.1 | 0.1 | 0.1 | 0.1 | 0.1 |
| RO |  | 12.8 | 13.1 | 13.1 | 12.9 | 12.8 | 13.0 | 13.0 |
| CaO/RO |  | 0.74 | 0.73 | 0.73 | 0.74 | 0.74 | 0.73 | 0.73 |
| CaO/$Al_2O_3$ |  | 0.88 | 0.84 | 0.84 | 0.88 | 0.86 | 0.88 | 0.87 |
| $Al_2O_3$/$B_2O_3$ |  | 1.09 | 1.20 | 1.09 | 1.11 | 1.11 | 1.11 | 1.10 |
| Density (g/cm$^3$) |  | 2.46 | 2.46 | 2.46 | 2.46 | 2.46 | 2.46 | 2.46 |
| α[30-380] (×10$^{-7}$/° C.) |  | 38 | 38 | 39 | 39 | 39 | 39 | 38 |
| Ps (° C.) |  | 667 | 673 | 667 | 668 | 670 | 667 | 669 |
| Ta (° C.) |  | 721 | 728 | 721 | 722 | 726 | 721 | 724 |
| Ts (° C.) |  | 954 | 960 | 951 | 955 | 960 | 953 | 958 |
| 10$^4$ dPa · s (° C.) |  | 1,276 | 1,278 | 1,269 | 1,278 | 1,278 | 1,273 | 1,280 |
| 10$^3$ dPa · s (° C.) |  | 1,439 | 1,439 | 1,428 | 1,443 | 1,438 | 1,437 | 1,442 |
| 10$^{2.5}$ dPa · s (° C.) |  | 1,546 | 1,542 | 1,530 | 1,550 | 1,547 | 1,543 | 1,547 |
| TL (° C.) |  | 1,080 | 1,115 | 1,095 | 1,095 | 1,105 | 1,085 | 1,080 |
| log η TL |  | 5.8 | 5.5 | 5.6 | 5.7 | 5.6 | 5.8 | 5.9 |
| $SnO_2$ devitrification resistance |  | ○ | ○ | ○ | ○ | ○ | ○ | ○ |
| $ZrO_2$ devitrification resistance |  | ○ | ○ | ○ | ○ | ○ | ○ | ○ |
| Young's modulus |  | 73 | 74 | 73 | 73 | 73 | 73 | 73 |
| Specific modulus |  | 30 | 30 | 30 | 30 | 30 | 30 | 30 |
| Erosion depth in 10 wt % HCl |  | ◉ | ◉ | ◉ | ◉ | ◉ | ◉ | ◉ |
| Erosion depth in 130 BHF |  | ◉ | ◉ | ◉ | ◉ | ◉ | ◉ | ◉ |
| External appearance evaluation in 10 wt % HCl |  | ○ | ○ | ○ | ○ | ○ | ○ | ○ |
| External appearance evaluation in 63 BHF |  | ○ | ○ | ○ | ○ | ○ | ○ | ○ |

TABLE 8

|  |  | Example | | | | | | |
|---|---|---|---|---|---|---|---|---|
|  |  | 50 | 51 | 52 | 53 | 54 | 55 | 56 |
| Glass composition mol % | $SiO_2$ | 66.2 | 67.1 | 66.3 | 66.7 | 66.8 | 66.4 | 66.7 |
|  | $Al_2O_3$ | 10.8 | 10.7 | 11.2 | 11.1 | 10.0 | 10.7 | 11.1 |
|  | $B_2O_3$ | 9.9 | 9.1 | 9.2 | 9.1 | 9.0 | 9.5 | 9.6 |
|  | MgO | 0.5 | 0.3 | — | 0.8 | 1.6 | 1.6 | 1.6 |
|  | CaO | 9.5 | 9.1 | 9.6 | 9.1 | 9.4 | 8.9 | 8.3 |
|  | SrO | 2.6 | 3.2 | 2.9 | 2.6 | 2.6 | 2.2 | 1.9 |
|  | BaO | 0.4 | 0.4 | 0.7 | 0.5 | 0.5 | 0.4 | 0.7 |
|  | $SnO_2$ | 0.1 | 0.1 | 0.1 | 0.1 | 0.1 | 0.1 | 0.1 |
| RO |  | 13.0 | 13.0 | 13.2 | 13.0 | 14.1 | 13.2 | 12.5 |
| CaO/RO |  | 0.73 | 0.70 | 0.73 | 0.70 | 0.67 | 0.68 | 0.66 |
| CaO/$Al_2O_3$ |  | 0.88 | 0.85 | 0.86 | 0.82 | 0.94 | 0.83 | 0.75 |

TABLE 8-continued

| | Example | | | | | | |
|---|---|---|---|---|---|---|---|
| | 50 | 51 | 52 | 53 | 54 | 55 | 56 |
| $Al_2O_3/B_2O_3$ | 1.09 | 1.18 | 1.22 | 1.22 | 1.11 | 1.13 | 1.16 |
| Density (g/cm$^3$) | 2.46 | 2.47 | 2.48 | 2.47 | 2.47 | 2.45 | 2.45 |
| α[30-380] (×10$^{-7}$/° C.) | 38 | 39 | 39 | 38 | 39 | 38 | 37 |
| Ps (° C.) | 667 | 671 | 671 | 675 | 672 | 672 | 674 |
| Ta (° C.) | 722 | 727 | 727 | 730 | 726 | 727 | 729 |
| Ts (° C.) | 954 | 961 | 963 | 959 | 941 | 947 | 954 |
| 10$^4$ dPa·s (° C.) | 1,270 | 1,283 | 1,274 | 1,278 | 1,274 | 1,272 | 1,279 |
| 10$^6$ dPa·s (° C.) | 1,432 | 1,445 | 1,435 | 1,438 | 1,437 | 1,434 | 1,441 |
| 10$^{2.5}$ dPa·s (° C.) | 1,538 | 1,549 | 1,541 | 1,544 | 1,545 | 1,540 | 1,549 |
| TL (° C.) | 1,075 | 1,090 | 1,100 | 1,095 | 1,085 | 1,075 | 1,090 |
| log η TL | 5.9 | 5.8 | 5.7 | 5.7 | 5.7 | 5.8 | 5.7 |
| SnO$_2$ devitrification resistance | ○ | ○ | ○ | ○ | ○ | ○ | ○ |
| ZrO$_2$ devitrification resistance | ○ | ○ | ○ | ○ | ○ | ○ | ○ |
| Young's modulus | 73 | 73 | 73 | 74 | 74 | 74 | 74 |
| Specific modulus | 30 | 30 | 30 | 30 | 30 | 30 | 30 |
| Erosion depth in 10 wt % HCl | ⊚ | ⊚ | ⊚ | ⊚ | ⊚ | ⊚ | ⊚ |
| Erosion depth in 130 BHF | ⊚ | ⊚ | ⊚ | ⊚ | ⊚ | ⊚ | ⊚ |
| External appearance evaluation in 10 wt % HCl | ○ | ○ | ○ | ○ | ○ | ○ | ○ |
| External appearance evaluation in 63 BHF | ○ | ○ | ○ | ○ | ○ | ○ | ○ |

Each glass sample was produced as follows. A batch in which raw materials were mixed to yield predetermined proportions was placed in a platinum crucible, melted at 1,600° C. for 24 hours, poured on a carbon plate, and formed into a plate shape.

Various properties, such as densities, strain points, and viscosities of the glass samples were measured.

The density was measured by a well-known Archimedes' method.

As the thermal expansion coefficient, an average thermal expansion coefficient in the temperature range of 30 to 380° C. was measured with a dilatometer based on JIS R3102.

The strain point Ps, the annealing point Ta, and the softening point Ts were measured based on JIS R3103.

A temperature in a viscosity of 10$^{2.5}$ dPa·s, a temperature in a viscosity of 10$^3$ dPa·s, and a temperature in a viscosity of 10$^4$ dPa·s were measured using a known platinum sphere pull up method.

The liquidus temperature TL refers to the temperature at which devitrification (crystalline foreign substance) was observed in glass. The measurement was performed by crushing each glass sample, passing the crushed sample glass through a standard 30-mesh sieve (500-μm openings), placing the remaining glass powders on a 50-mesh standard sieve (300-μm openings) in a platinum boat, and holding the same in a temperature gradient furnace for 24 hours. The liquidus viscosity refers to a value obtained by measuring the glass viscosity at a liquidus temperature by the well-known platinum sphere pull up method.

The liquidus temperature of glass to which SnO$_2$ was added (SnO$_2$ devitrification resistance) refers to a temperature at which crystals were deposited. The measurement was performed by adding SnO$_2$ to a raw material batch until the content of SnO$_2$ level reach 0.2% in the glass composition, melting and forming glass under the same conditions as above, crushing the obtained glass sample, passing the crushed glass sample through a 30-mesh standard sieve (500-μm), placing the remaining glass powders on a 50-mesh standard sieve mesh (300-μm) in a platinum boat, and holding the same in a temperature gradient furnace for 1 week. Subsequently, glass showed no devitrification at 1,150° C. was graded as "○" and glass showed devitrification at 1,150° C. was graded as "x". The clarity of glass was evaluated in parallel to the above evaluation, which showed that no bubble defect was observed in glass when SnO$_2$ was added until the content reach 0.2%.

The liquidus temperature of glass to which ZrO$_2$ was added (ZrO$_2$ devitrification resistance) refers to a temperature at which crystals were deposited. The measurement was performed by adding ZrO$_2$ whose content level equivalent to 0.3% in the glass composition to a raw material batch, melting and forming glass under the same conditions as above, crushing the obtained glass sample, passing the crushed glass sample through a 30-mesh standard sieve (500-μm), placing the remaining glass powders on a 50-mesh standard sieve mesh (300-μm) in a platinum boat, and holding the same in a temperature gradient furnace for 1 week. Subsequently, glass showed no devitrification at 1,150° C. was graded as "○" and glass showed devitrification at 1,150° C. was graded as "x".

The Young's modulus was measured by a resonance method. The specific modulus was calculated by dividing the Young's modulus by the viscosity.

The BHF resistance and the HCl resistance were evaluated by the following method. First, the both surfaces of each glass sample were optically polished, and after a part thereof was masked, the glass sample was immersed in a chemical liquid having a predetermined concentration at a set temperature for a set period of time. After the chemical liquid treatment, a mask was removed, and a step formed between the masked part and an eroded part was measured with a surface roughness meter. The value obtained therefrom was referred to as an erosion depth. The BHF resistance was evaluated as follows: "⊚" when the erosion depth is less than 1 μm; "○" when the erosion depth is 1 μm or more and less than 2 μm; and "x" when the erosion depth is 2 μm or more. Further, the HCl resistance was evaluated as follows: "⊚" when the erosion depth is less than 5 μm; "○" when the erosion depth is 5 μm or more and less than 10 μm; and "x" when the erosion depth is 10 μm or more. As for the external appearance evaluation, the both surfaces of each glass sample were optically polished, and after the glass sample was immersed in a chemical liquid having a predetermined concentration at a set temperature for a set period of time, the glass surface was visually observed. The external appearance was evaluated as follows: "○" when the glass surface is not changed; and "x" when white turbidity, roughness, or crack is observed in the glass surface. The chemical liquids and the treatment conditions are as follows. The BHF resistance was measured using a 130 BHF solution under the treatment conditions of 20° C. and 30 minutes. The external appearance evaluation was performed using a 63 BHF solution under the treatment conditions of 20° C. and 30 minutes. Further, the HCl resistance was measured using a 10 mass % hydrochloric acid aqueous solution under the treatment conditions of 80° C. and 24 hours. The external appearance evaluation was performed using the 10 mass % hydrochloric acid aqueous solution under the treatment conditions of 80° C. and 3 hours.

Each glass sample had a viscosity of 2.43 to 2.50 g/cm$^3$, thermal expansion coefficient of 37 to 42×10$^{-7}$/° C., strain point of 656 to 677° C., annealing point of 704 to 730° C., softening point of 914 to 963° C., temperature at a viscosity of 10$^{2.5}$ dPa·s of 1,484 to 1,550° C., liquidus temperature of 1,065 to 1,130° C., liquidus viscosity of 10$^{5.2}$ to 10$^{5.9}$ dPa·s, Young's modulus of 72 to 76 GPa, and specific modulus of 29 to 31 GPa/g·cm$^{-3}$.

Therefore, in each glass sample, no substance of environmental concern such as As$_2$O$_3$ and Sb$_2$O$_3$ was contained, and thus, each glass sample takes the environment into consideration. Because each glass sample has the viscosity of 2.50 g/cm$^3$ or lower, a light-weight glass substrate was achieved. Because the thermal expansion coefficient was within the range of 35 to 45×10$^{-7}$/° C., the matching with various thin films was excellent. Because the strain point was 640° C. or higher, glass was unlikely to be thermally contracted due to a heat treatment in a display manufacturing process. Because each glass sample had that the liquidus temperature of 1,200° C. or lower and the liquidus viscosity of 10$^{5.2}$ dPa·s or higher, the devitrification resistance and glass formability were outstanding. Because the temperature at a viscosity of 10$^{2.5}$ dPa·s was 1,550° C. or lower, the melting of glass and glass formability were excellent, and moreover, the chemical resistances, especially the BHF resistance and acid resistance of each glass sample, were outstanding.

Further, a glass substrate for a display with a substrate size of 900 mm×1,100 mm and with a thickness of 0.5 mm was obtained by melting the respective glass samples No. 1 to 56 in a melting furnace, and forming the resultant into a glass substrate according to the overflow down draw method. The curvature of the obtained glass substrate was 0.05% or lower, waviness (WCA) was 0.1 μm or lower, and surface roughness (Ra) was 50 Å or lower (cut-off λc: 9 μm). The obtained glass substrate had excellent surface quality, and thus was suitable as a glass substrate for an LCD. In the formation of a glass substrate according to the overflow down draw method, the surface quality of the glass substrate was adjusted by suitably adjusting the rate of a drawing roller, rate of an annealing roller, temperature distribution of a heating system, temperature of molten glass, flow amount of glass, rate of plate drawing, rotation numbers of a stirrer, etc. The "curvature" was measured by placing the glass substrate on an optical surface plate using a feeler gauge described in JIS B-7524. The "waviness" refers to a value obtained by measuring WCA (filtered centerline waviness) according to a method described in JIS B-0610 using a stylus type surface shape measuring instrument. This measurement was performed according to a method following to SEMI STD D15-1296 "FPD glass substrate surface waviness measurement method". The cut-off was 0.8 to 8 mm and the sample was measured at a length of 300 mm in the direction perpendicular to the drawing direction of the glass substrate. The "average surface roughness (Ra)" refers to a value measured by a method according to SEMI D7-94 "FPD glass substrate surface roughness measurement method".

INDUSTRIAL APPLICABILITY

The alkali-free glass of the present invention is an environmentally friendly glass in which a glass raw material is easily recycled, and it is less probable that the glass causes the environmental pollution, and thus, the alkali-free glass is suitable as a next-generation glass substrate. Further, the alkali-free glass of the present invention satisfies various demand characteristics and is particularly excellent in meltability and devitrification resistance of the glass, and thus, the alkali-free glass can enhance the production efficiency of a large-sized and/or thin-type glass substrate while the production cost of the glass substrate can be reduced.

The invention claimed is:

1. An alkali metal-free glass, which:
   has a glass composition being substantially free of an alkali metal oxide, As$_2$O$_3$, and Sb$_2$O$_3$,
   comprising, in terms of mol %, 55 to less than 70% of SiO$_2$, 7 to 15% of Al$_2$O$_3$, 7 to 12% of B$_2$O$_3$, 0 to 3% of MgO, 7 to 12% of CaO, 0 to 5% of SrO, 0.01 to 1% of BaO, 0 to 5% of ZnO, and 0.01 to 1% of SnO$_2$; and
   has a liquidus viscosity of 10$^{5.2}$ dPa·s or higher, a temperature corresponding to a viscosity of 10$^{2.5}$ dPa·s of 1,550° C. or lower, and a thermal expansion coefficient over a temperature range of 30 to 380° C. of larger than 34× 10$^{-7}$/° C. to 45×10$^{-7}$/° C.

2. The alkali metal-free glass according to claim 1, which has a content of RO, which represents MgO+CaO+SrO+BaO+ZnO, of 10 to 20%.

3. The alkali metal-free glass according to claim 1 or 2, which has a value of a molar ratio CaO/RO of 0.5 to 1.

4. The alkali metal-free glass according to claim 1 or 2, which has a value of a molar ratio CaO/Al$_2$O$_3$ of 0.8 to 1.2.

5. The alkali metal-free glass according to claim 1 or 2, which has a value of a molar ratio Al$_2$O$_3$/B$_2$O$_3$ of 0.8 to 1.3.

6. The alkali metal-free glass according to claim 1 or 2, which has a Cl content of 0 to 1%.

7. The alkali metal-free glass according to claim 1 or 2, which has a MgO content of 0 to lower than 0.5%.

8. The alkali metal-free glass according to claim 1 or 2, which has a strain point of 630° C. or higher.

9. The alkali metal-free glass according to claim 1 or 2, which has a density of lower than 2.50 g/cm$^3$.

10. The alkali metal-free glass according to claim 1 or 2, which has the liquidus viscosity of 10$^{5.5}$ dPa·s or higher.

11. The alkali metal-free glass according to claim 1 or 2, which has a liquidus temperature of lower than 1,100° C.

12. The alkali metal-free glass according to claim 1 or 2, which has a specific modulus of 29.5 GPa or higher.

13. The alkali metal-free glass according to claim 1 or 2, which is formed by an overflow down draw method.

14. An alkali metal-free glass substrate, comprising the alkali metal-free glass according to claim 1 or 2.

15. The alkali metal-free glass substrate according to claim 14, which is used for a display.

16. The alkali metal-free glass substrate according to claim 14, which is used for a liquid crystal display or an OLED display.

17. The alkali metal-free glass substrate according to claim 14, which is used for a liquid crystal display for a flat television.

* * * * *